United States Patent
Kim et al.

(10) Patent No.: US 7,092,146 B2
(45) Date of Patent: Aug. 15, 2006

(54) METHOD AND APPARATUS FOR CONTROLLING A SOA-MZI WAVELENGTH CONVERTER

(75) Inventors: Joo-youp Kim, Seongnam-si (KR); Sang-kook Han, Seoul (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 11/318,511

(22) Filed: Dec. 28, 2005

(65) Prior Publication Data

US 2006/0139738 A1    Jun. 29, 2006

(30) Foreign Application Priority Data

Dec. 29, 2004   (KR) .................. 10-2004-0115047

(51) Int. Cl.
*G02F 2/02* (2006.01)
*G02F 1/39* (2006.01)
(52) U.S. Cl. ..................................... 359/326; 359/330
(58) Field of Classification Search ......... 359/326–332
See application file for complete search history.

(56) References Cited

U.S. PATENT DOCUMENTS

| | | | |
|---|---|---|---|
| 5,532,857 A | 7/1996 | Gertel et al. | |
| 6,624,924 B1 * | 9/2003 | Dave et al. | 359/326 |
| 6,678,086 B1 * | 1/2004 | Dave et al. | 359/326 |
| 6,867,903 B1 * | 3/2005 | Imajuku et al. | 359/330 |
| 7,012,740 B1 * | 3/2006 | Imajuku et al. | 359/330 |
| 2004/0001247 A1 * | 1/2004 | Nojima | 359/326 |
| 2005/0100281 A1 * | 5/2005 | Kim et al. | 385/39 |

FOREIGN PATENT DOCUMENTS

| | | |
|---|---|---|
| JP | 9-321740 | 12/1997 |
| KR | 1999-0085753 | 12/1999 |
| KR | 2001-0060735 | 7/2001 |

* cited by examiner

*Primary Examiner*—John D. Lee
(74) *Attorney, Agent, or Firm*—Lee & Morse, P.C.

(57) ABSTRACT

A method and apparatus for controlling an optical gain difference and an optical phase difference in a semiconductor optical amplifier—Mach-Zehnder interferometer (SOA-MZI) wavelength converter having two arms and that outputs probe output signals $P_{OH}$ and $P_{OL}$, corresponding to pump input signals of logic high and logic low, respectively. The controlling includes detecting an optical power level of the output probe signals and controlling at least one of an optical gain difference between the two arms and an optical phase difference between the two arms in accordance with a detected optical power level of the probe output signal.

40 Claims, 9 Drawing Sheets

METHOD AND APPARATUS FOR CONTROLLING A SOA-MZI WAVELENGTH CONVERTER

BACKGROUND OF THE INVENTION

1. Field of the Invention

The present invention relates to a semiconductor optical amplifier—Mach-Zehnder interferometer (SOA-MZI). More particularly, the present invention relates to a method of controlling at least one of an optical gain difference and an optical phase difference, particularly to optimize an extinction ratio (ER), and apparatuses appropriate therefore.

2. Description of the Related Art

A broadband information communication network having a large capacity, increased transmission speed, increased operational efficiency and improved reliability is needed. Wavelength division multiplexing (WDM) transmission is one intercommunication technology that meets the above needs. WDM not only increases the transmission capacity, but also establishes a reconfigurable network. In a WDM network, data is transmitted to nodes along a path that is determined by a wavelength used. However, due to connections between networks using different wavelengths and/or a limit on the number of wavelengths which can be used per channel in a network, wavelengths may interfere with each other as the same wavelength is used in different channels, or assignment of a path to each wavelength and efficient routing is made difficult, giving rise to problems in the system.

Accordingly, to efficiently operate a WDM all-optical network, optical exchange is needed at each node to avoid channel conflict and to provide wavelength reallocation. Such optical exchange may be performed by an optical cross connect (OXC). The OXC consists of a wavelength converter converting an input signal at one wavelength to an output signal at another wavelength, a spatial switch routing paths of wavelengths, an optical add/drop multiplexer (OADM) adding or dropping a path of an optical signal that is input or output at a node, and a MUX/DEMUX coupling signals in various wavelengths or separating a coupled signal. Of the above devices, the wavelength converter is a core device of the OXC. The conversion of a wavelength allows incoming data carried on a particular wavelength to be transmitted using a newly assigned wavelength. The wavelength conversion may rely on cross-gain modulation (XGM) using non-linearity of a semiconductor optical amplifier (SOA), cross-phase modulation (XPM) and four wave-mixing (FWM). A SOA-MZI wavelength converter uses XPM.

In general, an SOA is an optical amplifier that, when an input signal having a small amplitude is incident on an active layer of a semiconductor in a state in which a density is inverted by the injection of current, the input signal is amplified by stimulated emission in which free electrons in a conduction band are coupled to holes in a valence band, thereby emitting photons. Thus, an amplified optical signal is output.

FIG. 1 illustrates a block diagram showing the structure of a conventional SOA-MZI wavelength converter. Referring to FIG. 1, the SOA-MZI wavelength converter converts the wavelength of an input optical signal from λ1 to λ2 using XPM. The SOA-MZI wavelength converter shown in FIG. 1 includes a first SOA 102, a second SOA 104, a phase shifter 106, and an optical bandwidth pass filter (OBPF) 108.

The first SOA 102 amplifies a pump input signal $P_{pump}$ and a probe input signal $P_{probe}$. When $P_{pump}$ is logic 1, the first SOA 102 also shifts the phase of $P_{probe}$ due to XPM. The optical gain of the first SOA 102 is controlled by a bias current $i_1$. In the SOA-MZI wavelength converter shown in FIG. 1, a portion amplifying the pump input signal $P_{pump}$ and the probe input signal $P_{probe}$ using the first SOA 102 is referred to as a first arm. The second SOA 104 amplifies the probe input signal $P_{probe}$. The optical gain of the second SOA 104 is controlled by a bias current $i_2$. In the SOA-MZI wavelength converter shown in FIG. 1, a portion amplifying the probe input signal $P_{probe}$ using the second SOA 104 and shifting the phase of an amplified optical signal output from the SOA 104 using the phase shifter 106 is referred to as a second arm.

The phase shifter 106 changes an optical phase difference $\phi$ between the first and second arms to $\pi$ in order to increase an extinction ratio (ER). When the optical phase difference $\phi$ between the first and second arms is $\pi$ and an optical phase difference $\phi_{XPM}$ generated due to $P_{probe}$ being logic 1 is $\pi$, constructive interference occurs. When the optical phase difference $\phi$ between the first and second arms is $\pi$ and probe input signal $P_{probe}$ is logic 0, i.e., $\phi_{XPM}$ is 0, destructive interference occurs. Thus, ER is optimized.

The OBPF 108 cuts off a pump output signal at λ1 and passes only a probe output signal at λ2. Thus, only a probe output signal having a wavelength of λ2 modulated to the shape of a pump signal is transmitted, thereby achieving wavelength conversion.

FIGS. 2A–2C illustrate waveform diagrams showing the operation of the apparatus shown in FIG. 1. In FIG. 2A, a waveform diagram shows a pump input signal. The pump input signal may be an intensity modulated (IM) optical signal at λ1, i.e., has a binary pulse. In FIG. 2B, a waveform diagram shows a probe input signal. The probe input signal may be a continuous wave (CW) optical signal at λ2, e.g., a laser signal. In FIG. 2C, a waveform diagram shows a probe output signal output from the OBPF 108. The probe output signal is a signal having a wavelength of λ2 and is intensity-modulated to a pulse form identical to the pump input signal, i.e., an IM optical signal having a wavelength converted from λ1 to λ2.

Referring to the waveforms illustrated in FIGS. 2A–2C, the apparatus shown in FIG. 1 converts an IM optical signal at λ1 to an IM optical signal at λ2, i.e., converts the wavelength.

FIG. 3A illustrates a graph of optical gains relative to input power of the first and second SOAs 102 and 104 shown in FIG. 1. Referring to FIG. 3A, the optical gains of the first and second SOAs 102 and 104 maintain particular values until a threshold value, indicated by a dotted line, and decrease at a particular inclination after the threshold value, demonstrating a gain saturation characteristic.

FIG. 3B illustrates a graph of a phase difference relative to input power between the two arms of the SOA-MZI wavelength converter shown in FIG. 1. Referring to FIG. 3B, the phases of the two SOAs 102 and 104 characteristically change at the threshold value. That is, when the amplitudes of signals input to the two SOAs 102 and 104 are less than a threshold value or $P_{pump}$ is logic low, the phase difference is simply equal to a phase shift introduced by the phase shifter 106, here $\pi$. When the signal amplitudes exceed the threshold value and $P_{pump}$ is logic high, then the phase difference is the sum of $\phi$ and $\phi_{XPM}$, which may be up to $\pm\pi$.

In the SOA-MZI wavelength converter of FIG. 1, the phase of the second arm is delayed relative to the first arm by $\pi$ due to the phase shifter 106. When the amplitude of the pump input signal is lower than the threshold value, no phase delay occurs in the first SOA 102. When the amplitude of the pump input signal is higher than the threshold value, an optical phase difference $\phi_{XPM}$ of up to $\pm\pi$ may be generated due to XPM.

The pump input signal is binary. Thus, in the SOA-MZI wavelength converter, considering $\phi_{XPM}$, the optical phase difference $\phi$ between the first and second arms is $\pi$ when the pump input signal is logic 0 and is 0 when the pump input signal is logic 1. Hence, when the pump input signal is logic 1, the optical power levels of the probe output signals interfere in accordance with the sum of $\phi$ and $\phi_{XPM}$, and, when the pump input signal is logic 0, the optical power levels of the probe output signals interfere in accordance with $\phi$. Thus, the optical power levels of the probe output signal are modulated to be identical to the logic level of the pump input signal.

That is, in the probe output signal, constructive interference results when a total optical phase difference is zero or an integer multiple of $2\pi$ and destructive interference results when the total optical phase difference $\phi$ is $(2n+1)\pi$. Thus, the wavelength conversion is performed by the interference and the OBPF 108 so that a signal having a wavelength of $\lambda 1$ is changed to a signal having a wavelength of $\lambda 2$ and a probe output signal $P^O_{probe}$ shown in FIG. 2C is generated.

The SOA-MZI wavelength converter according to the conventional technology has a high ER and outputs a non-inverted signal. However, the phase shift arising from XPM is generated in a small range of a high pump input signal, i.e., in a small range at a high voltage level. Thus, the optical phase difference $\phi_{XPM}$ decreases as the power of the pump input signal decreases. Accordingly, an input power dynamic range (IPDR) of the pump input signal decreases.

Also, a high ER can be maintained by accurately adjusting the optical phase difference $\phi$ between the two arms to be $\pi$. For conventional technology to achieve this, the phase shifter 106 needs to be manually adjusted. However, it is difficult to manually adjust the phase shifter 106 to make the optical phase difference $\phi$ between the two arms be exactly $\pi$. It is further difficult to manually adjust the $\pi$ phase shifter 106 to take into account that the phase shift due to XPM is affected by the power of the pump input signal.

The difficulty in controlling the optical phase difference $\phi$ between the two arms to be $\pi$ is further increased, since the optical phase difference $\phi$ is very sensitive to external environmental factors, e.g., the operational temperature of the SOA.

SUMMARY OF THE INVENTION

The present invention is therefore directed to a method and apparatus for controlling at least one of an optical gain difference and an optical phase difference, which substantially overcome one or more of the problems due to the limitations and disadvantages of the related art.

It is therefore a feature of an embodiment of the present invention to provide a method and apparatus for controlling at least one of an optical gain difference and an optical phase difference that increases the input power dynamic range (IPDR).

It is therefore another feature of an embodiment of the present invention to provide a method and apparatus for controlling at least one of an optical gain difference and an optical phase difference that maintains an optimal extinction ratio (ER) of an output optical signal in the SOA-MZI wavelength converter.

It is yet another a feature of an embodiment of the present invention to provide a method and apparatus for controlling at least one of an optical gain difference which increases the IPDR and maintains an optimal ER of an output optical signal in the SOA-MZI wavelength converter.

At least one of the above and other features and advantages of the present invention may be realized by providing a method of operating a semiconductor optical amplifier—Mach-Zehnder interferometer (SOA-MZI) wavelength converter having two arms, a first arm receiving a pump input signal and a probe input signal and a second arm receiving the probe input signal, the SOA-MZI outputting probe output signals $P_{OH}$ and $P_{OL}$, which correspond to pump input signals of logic high and logic low, respectively, the method including detecting an optical power level of the probe output signals $P_{OH}$ and $P_{OL}$, and controlling at least one of an optical gain difference between the two arms and an optical phase difference $\phi$ between the two arms in accordance with the detected optical power level of the probe output signals $P_{OH}$ and $P_{OL}$.

The method may further include obtaining transfer characteristic curves of the probe output signals $P_{OH}$ and $P_{OL}$ by measuring an optical power level of the probe output signals $P_{OH}$ and $P_{OL}$ while changing the optical phase difference $\phi$ between the first and second arms and, wherein the controlling at least one of an optical gain difference between the two arms and an optical phase difference $\phi$ is further in accordance with the transfer characteristic curves.

The obtaining the transfer characteristic curves may include setting a first value equal to a maximum value of the probe output signal $P_{OL}$, the maximum value of the probe output signal $P_{OL}$ occuring at a first time, setting a second value equal to a value of the probe output signal $P_{OH}$ at the first time, setting a third value equal to a minimum value of the probe output signal $P_{OL}$, the minimum value of the probe output signal $P_{OL}$ occuring at a second time, setting a fourth value equal to a value of the probe output signal $P_{OH}$ at the second time, determining control factors $P_1 G_{1L}$, $P_1 G_{1H}$, $P_1 G_2$, and $\phi_{XPM}$, in accordance with the first, second, third and fourth values, wherein $P_1$ is an optical power level of the probe input signal, $G_{1H}$ and $G_{1L}$ are optical gains the logic high and logic low respectively experienced by $P_{2H}$ and $P_{2L}$, which are optical power levels of the pump input signal corresponding to the logic high and logic low, respectively, in the first arm, $G_2$ is an optical gain of the second arm, and $\phi_{XPM}$ is an optical phase shift due to cross phase modulation (XPM), and determining the transfer characteristic curves using the control factors.

The controlling at least one of an optical gain difference between the two arms and an optical phase difference $\phi$ may include setting a probe output signal output from the first arm and a probe output signal output from the second arm to have equal amplitudes and opposite phases when the pump input signal is logic low. The controlling the optical phase difference includes may include controlling a phase shifter in one of the first and second arms and/or may include controlling the optical gains of the first and second arms.

The method may further include initializing the SOA-MZI by setting, for the pump input signal having logic low, the optical gain difference to zero. When $P_{OH}$ changes but $P_{OL}$ does not, controlling may include altering the optical gain difference. When both $P_{OH}$ and $P_{OL}$ change, controlling may include altering the optical phase difference. The setting for the initialization may include determining a combination of bias currents of the first and second arms to set the optical gain difference to zero. The determining may include setting combinations of the bias currents with respect to the first and second arms, applying bias currents to the first and second arms according to the set combinations and measuring an average level and a standard deviation, or a peak hold level and a bottom hold level, corresponding to $P_{OL}(\phi=0)$, $P_{OH}(\phi=0)$, $P_{OH}(\phi=\pi)$, and $P_{OL}(\phi=\pi)$ from the probe output signal that changes according to a change in the optical phase difference $\phi$, obtaining values of $P_1G_{1L}$, $P_1G_{1H}$, $P_1G_2$, and $\phi_{XPM}$ using the measured $P_{OL}(\phi=0)$, $P_{OH}(\phi=0)$, $P_{OH}(\phi=\pi)$, and $P_{OL}(\phi=\pi)$, and obtaining $P_{OH}$ and $P_{OL}$ transfer characteristic curves using the obtained values of $P_1G_{1L}$, $P_1G_{1H}$, $P_1G_2$ and $\phi_{XPM}$.

The method may further include checking whether the optical gain difference is reduced to zero by a given bias current combination using the obtained values of $P_1G_{1L}$, $P_1G_{1H}$, $P_1G_2$, and $\phi_{XPM}$. The method may further include determining the combinations of the bias current satisfying the condition $G_{1L}=G_2$ from the transfer characteristic curves of the $P_{OH}$ and $P_{OL}$.

The method may further include scanning the probe output signals $P_{OL}$ and $P_{OH}$ throughout a period of the optical phase difference, and performing initialization to initially set an optical phase difference corresponding to a minimum value of the probe output signal $P_{OL}$, wherein the controlling at least one of the optical phase difference and the optical gain difference comprises changing an optical phase difference between first and second arms to maintain amplitudes of $P_{OL}$ and $P_{OH}$ at initialization levels when there is a change in the detected optical power level of the probe output signal.

The detected optical power level of the probe output signal may be an average level and a standard deviation thereof. The detected optical power level of the probe output signal may be a peak hold level and a bottom hold level.

At least one of the above and other features and advantages of the present invention may be realized by providing an apparatus for controlling a semiconductor optical amplifier—Mach-Zehnder interferometer (SOA-MZI) wavelength converter having two arms, including a first arm including a first semiconductor optical amplifier (SOA) receiving a pump input signal of a binary logic and a probe input signal, and a second arm including a second semiconductor optical amplifier (SOA) connected in parallel to the first SOA and receiving the probe input signal, the SOA-MZI outputting probe output signals $P_{OH}$ and $P_{OL}$, which corresponds to pump input signals of logic high and logic low, respectively, the apparatus including an optical gain and optical phase difference control portion receiving a probe output signal, the optical gain and optical phase difference control portion altering at least one of an optical gain difference between the two arms and optical phase difference between the two arms in response to the probe output signal.

The optical gain and optical phase difference control portion may include a photodetector receiving the probe output signals and outputting electrical probe signals, a peak and bottom hold portion detecting a peak hold level and a bottom hold level of the electrical probe signals, and an optical gain and optical phase difference optimization portion controlling at least one of the optical gain difference and the optical phase difference between the two arms in accordance with a peak hold level and a bottom hold level of the electrical probe signals.

The optical gain and optical phase difference optimization portion may obtain transfer characteristic curves of the probe output signals $P_{OH}$ and $P_{OL}$ by measuring an optical power level of the probe output signals $P_{OH}$ and $P_{OL}$ while changing an optical phase difference between the two arms, and further control at least one of the optical phase difference and an optical phase difference between the two arms in accordance with the transfer characteristic curves.

The optical gain and optical phase difference optimization portion may set a first value equal to a maximum value of the probe output signal $P_{OL}$, the maximum value of the probe output signal $P_{OL}$ occuring at a first time, set a second value equal to a value of the probe output signal $P_{OH}$ at the first time, set a third value equal to a minimum value of the probe output signal $P_{OL}$, the minimum value of the probe output signal $P_{OL}$ occuring at a second time, set a fourth value equal to a value of the probe output signal $P_{OH}$ at the second time, determine control factors $P_1G_{1L}$, $P_1G_{1H}$, $P_1G_2$, and $\phi_{XPM}$, in accordance with the first, second, third and fourth values, wherein $P_1$ is an optical power level of the probe input signal, $G_{1H}$ and $G_{1L}$ are optical gains the logic high and logic low respectively experienced by $P_{2H}$ and $P_{2L}$, which are optical power levels of the pump input signal corresponding to the logic high and logic low, respectively, in the first arm, $G_2$ is an optical gain of the second arm, and $\phi_{XPM}$ is an optical phase shift due to cross phase modulation (XPM) in the first arm, and determine the transfer characteristic curves using the control factors.

The optical gain and optical phase difference optimization portion may control at least one of the optical gain difference and the optical phase difference by setting a probe output signal output from the first arm and a probe output signal output from the second arm to have equal amplitudes and opposite phases when the pump input signal is logic low.

The SOA-MZI may further include a phase shifter in one of the first and second arms, the phase shifter controlling the optical phase difference between the first and second arms, wherein the optical gain and optical phase difference optimization portion controls the phase shifter.

The optical gain and optical phase difference optimization portion may control the optical phase difference $\phi$ between the two arms by controlling optical gains of the first and second SOAs.

The optical gain and optical phase difference control portion may initialize the SOA-MZI by setting, for the pump input signal having logic low, the optical gain difference to zero. When $P_{OH}$ changes but $P_{OL}$ does not, the optical gain and optical phase difference control portion may alter the optical gain difference. When both $P_{OH}$ and $P_{OL}$ change, the optical gain and optical phase difference control portion may alter the optical phase difference.

The optical gain and optical phase difference control portion may set combinations of bias current with respect to the first and second SOAs, apply the bias currents to the first and second SOAs according to the set combinations and measure an average level and a standard deviation, or a peak hold level and a bottom hold level, corresponding to $P_{OL}(\phi=0)$, $P_{OH}(\phi=0)$, $P_{OH}(\phi=\pi)$, and $P_{OL}(\phi=\pi)$ from the probe output signal that changes according to a change in the optical phase difference $\phi$, obtain values of $P_1G_{1L}$, $P_1G_{1H}$, $P_1G_2$, and $\phi_{XPM}$ using the measured $P_{OL}(\phi=0)$, $P_{OH}(\phi=0)$, $P_{OH}(\phi=\pi)$, and $P_{OL}(\phi=\pi)$, and obtain transfer characteristic curves of probe output signals $P_{OH}$ and $P_{OL}$ using the obtained values of $P_1G_{1L}$, $P_1G_{1H}$, $P_1G_2$, and $\phi_{XPM}$.

The optical gain and optical phase difference control portion may set bias currents satisfying the condition $G_{1L}=G_2$ from the $P_{OH}$ and $P_{OL}$ transfer characteristic curves. The optical gain and optical phase difference control portion may obtain bias currents of the first and second SOAs satisfying the condition $G_{1L}=G_2$ by determining the combinations of the bias current satisfying the condition $G_{1L}=G_2$ from the transfer characteristic curves of the $P_{OH}$ and $P_{OL}$.

The optical gain and optical phase difference control portion may scan the probe output signals $P_{OL}$ and $P_{OH}$ throughout a period of an optical phase difference, perform initialization to initially set an optical phase difference corresponding to a minimum value of the probe output signal $P_{OL}$, measure an optical power level of the probe output signals, and change an optical phase difference between the first and second arms to maintain amplitudes of $P_{OL}$ and $P_{OH}$ at initialization levels when there is a change in the detected optical power level of the probe output signals.

A measured optical power level of the probe output signal may be an average level and a standard deviation thereof or a peak hold level and a bottom hold level.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Figure 1:
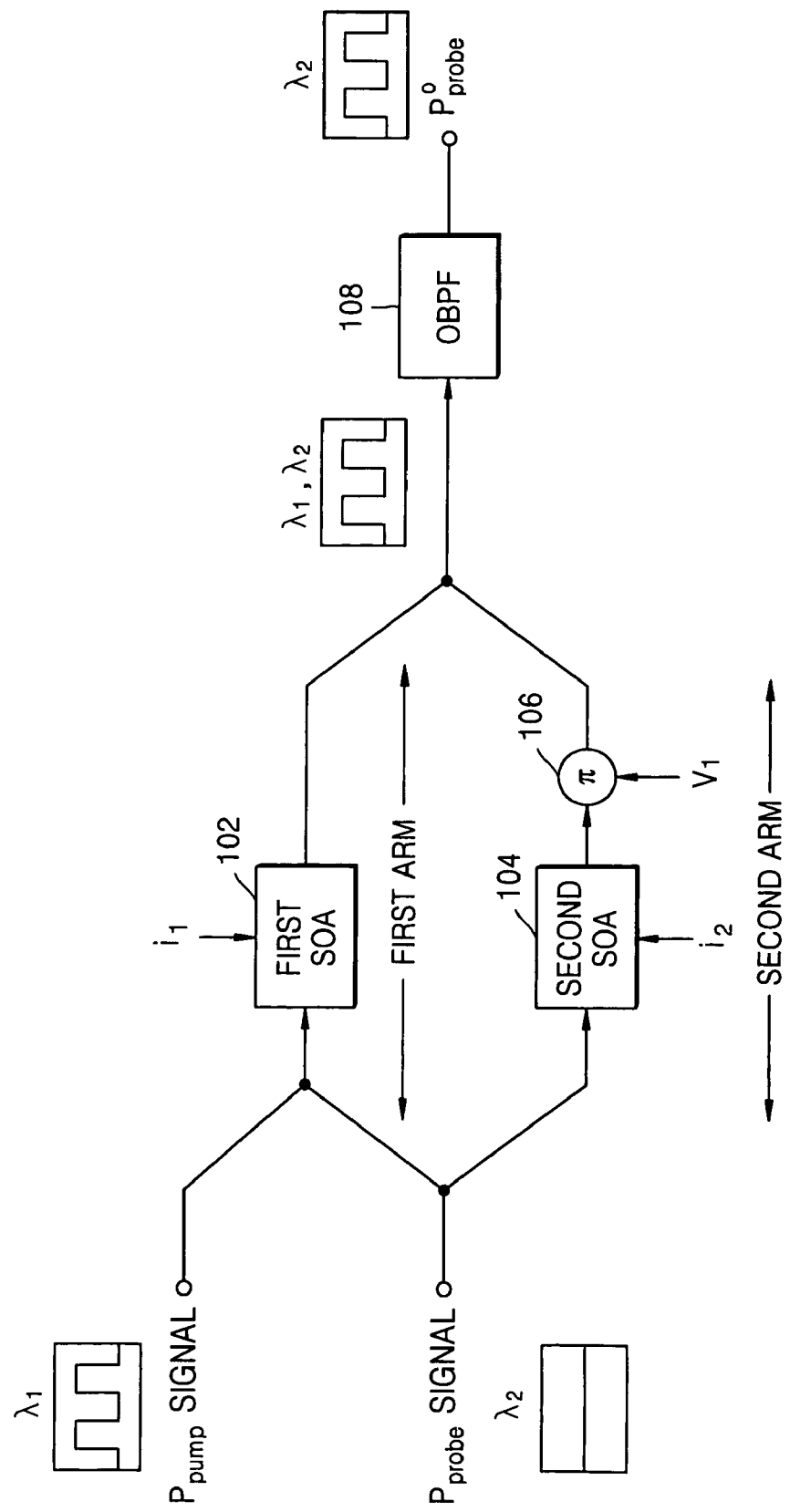
FIG. 1 illustrates a block diagram of the structure of a conventional SOA-MZI wavelength converter.
Figure 2A:
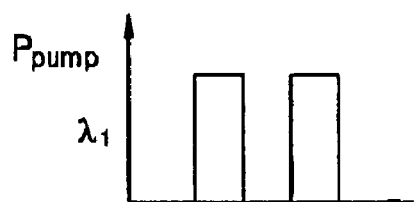
FIGS. 2A–2C illustrate waveform diagrams showing the operation of the apparatus of FIG. 1.
Figure 2B:
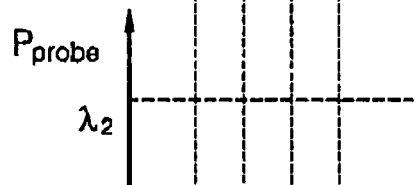
Figure 2C:
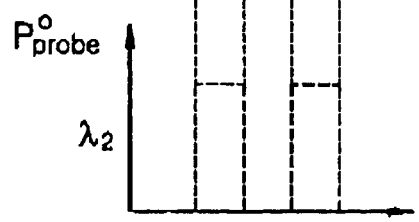
Figure 3A:
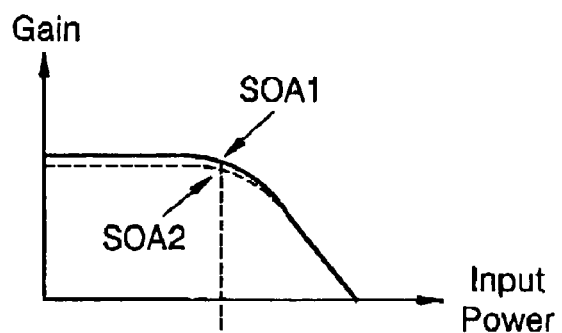
FIGS. 3A–3B illustrate graphs showing the optical gains of the first and second SOAs shown in FIG. 1 and a phase difference between the two arms of the SOA-MZI wavelength converter shown in FIG. 1, respectively.
Figure 3B:
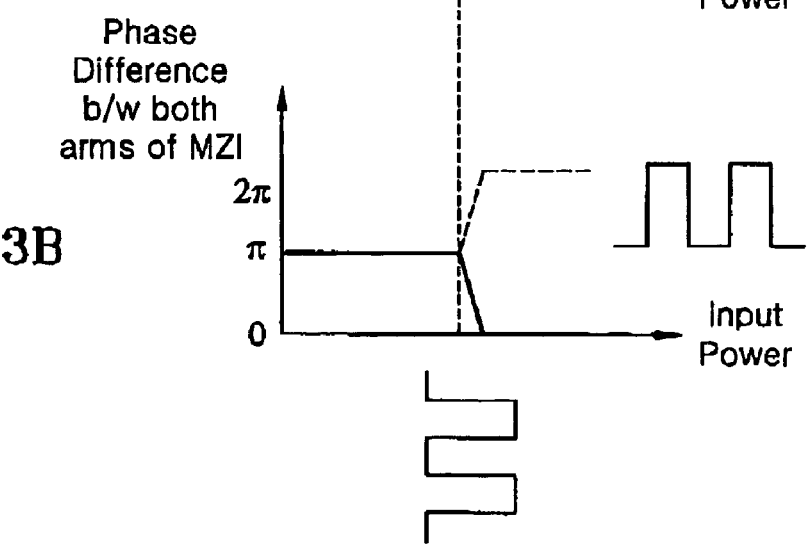

Korean Patent Application No. 10-2004-0115047, filed on Dec. 29, 2004, in the Korean Intellectual Property Office, and entitled: "Method for controlling optical gain difference and optical phase difference, method for controlling optical gain difference and method for controlling optical phase difference of SOA-MZI wavelength converter, and apparatuses therefor," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Figure 9:
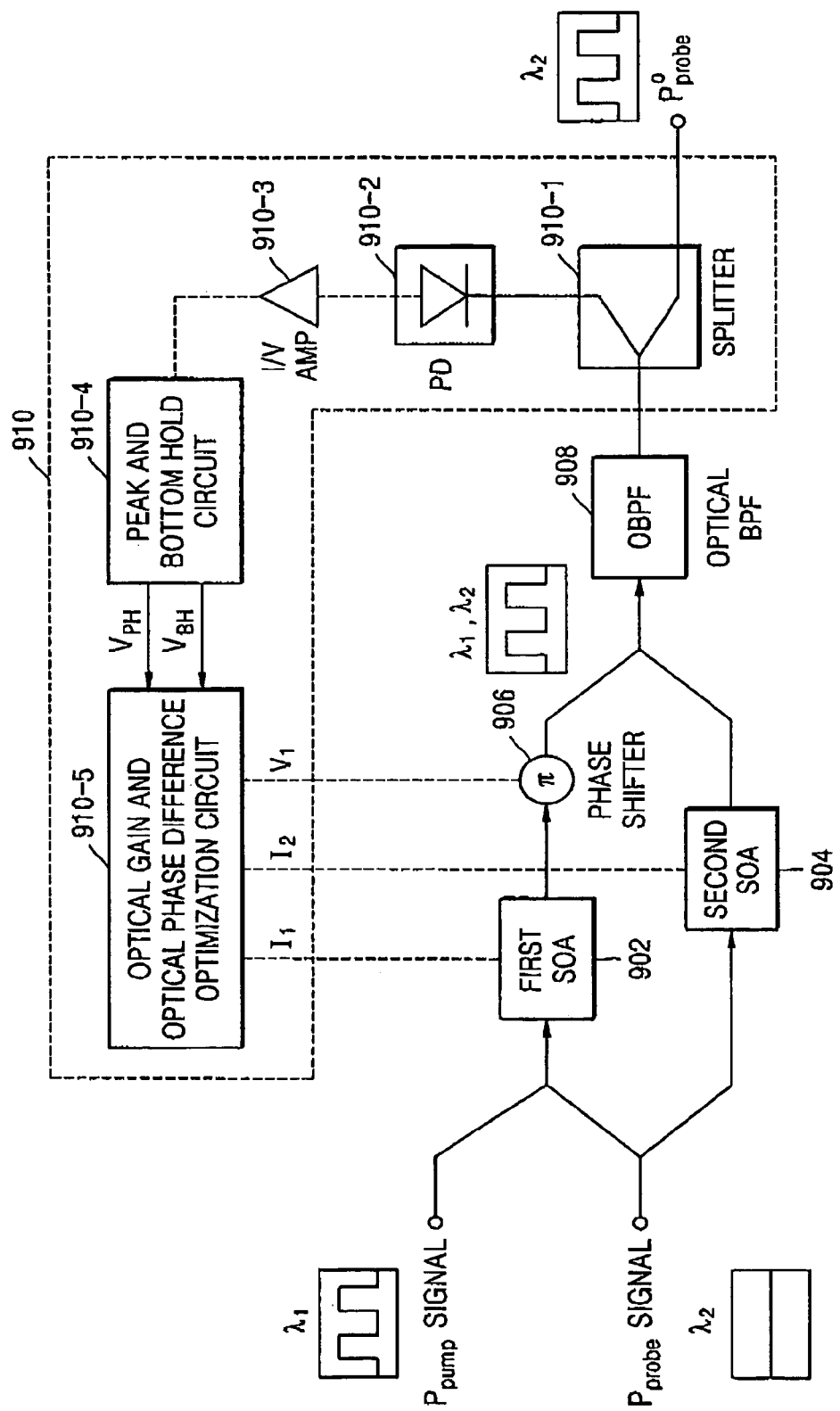
FIG. 9 illustrates a block diagram of the structure of an SOA-MZI wavelength converter according to an embodiment of the present invention.
Figure 10:
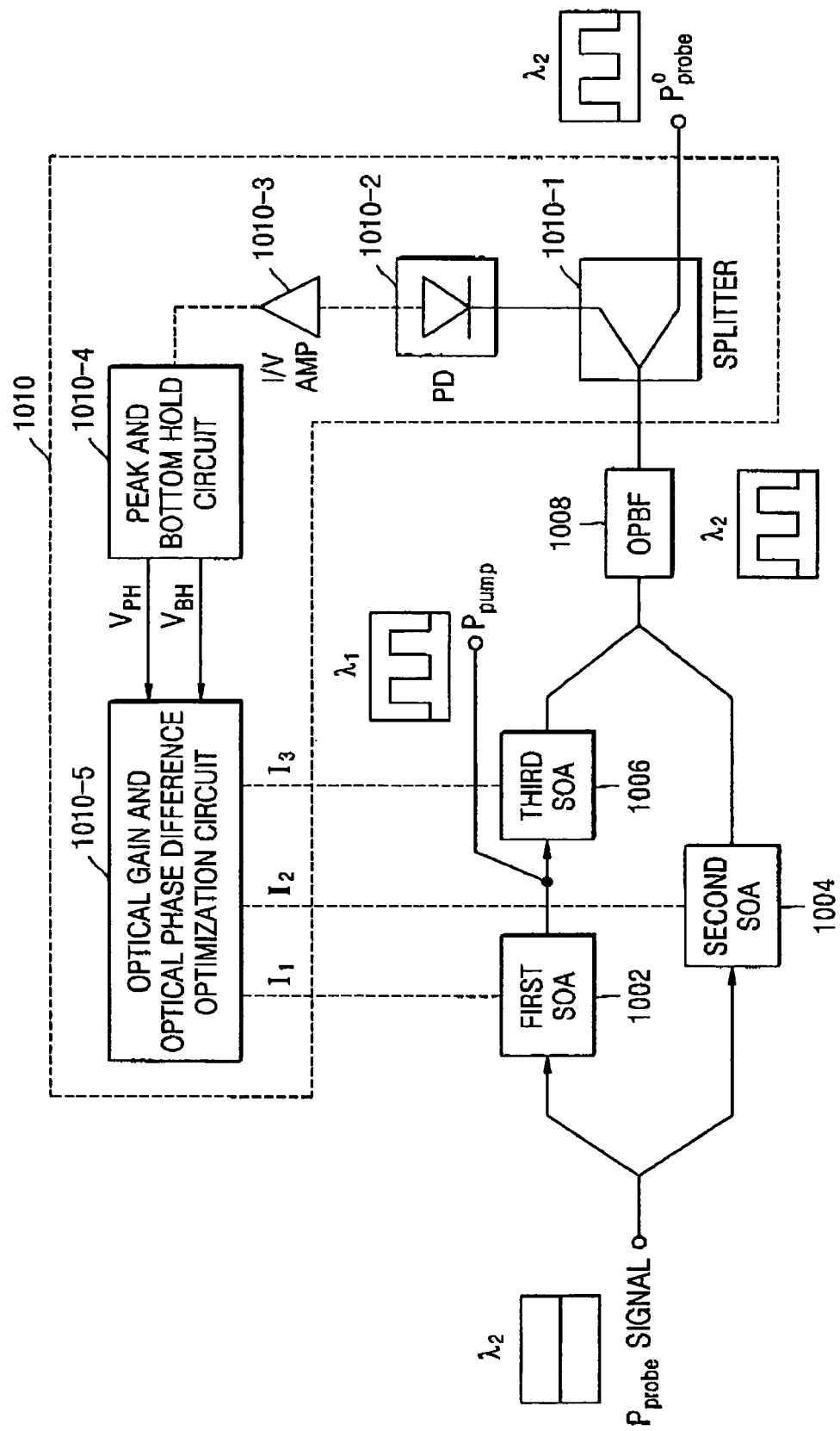
FIG. 10 illustrates a block diagram of a structure of an SOA-MZI wavelength converter according to another embodiment of the present invention.
Figure 11:
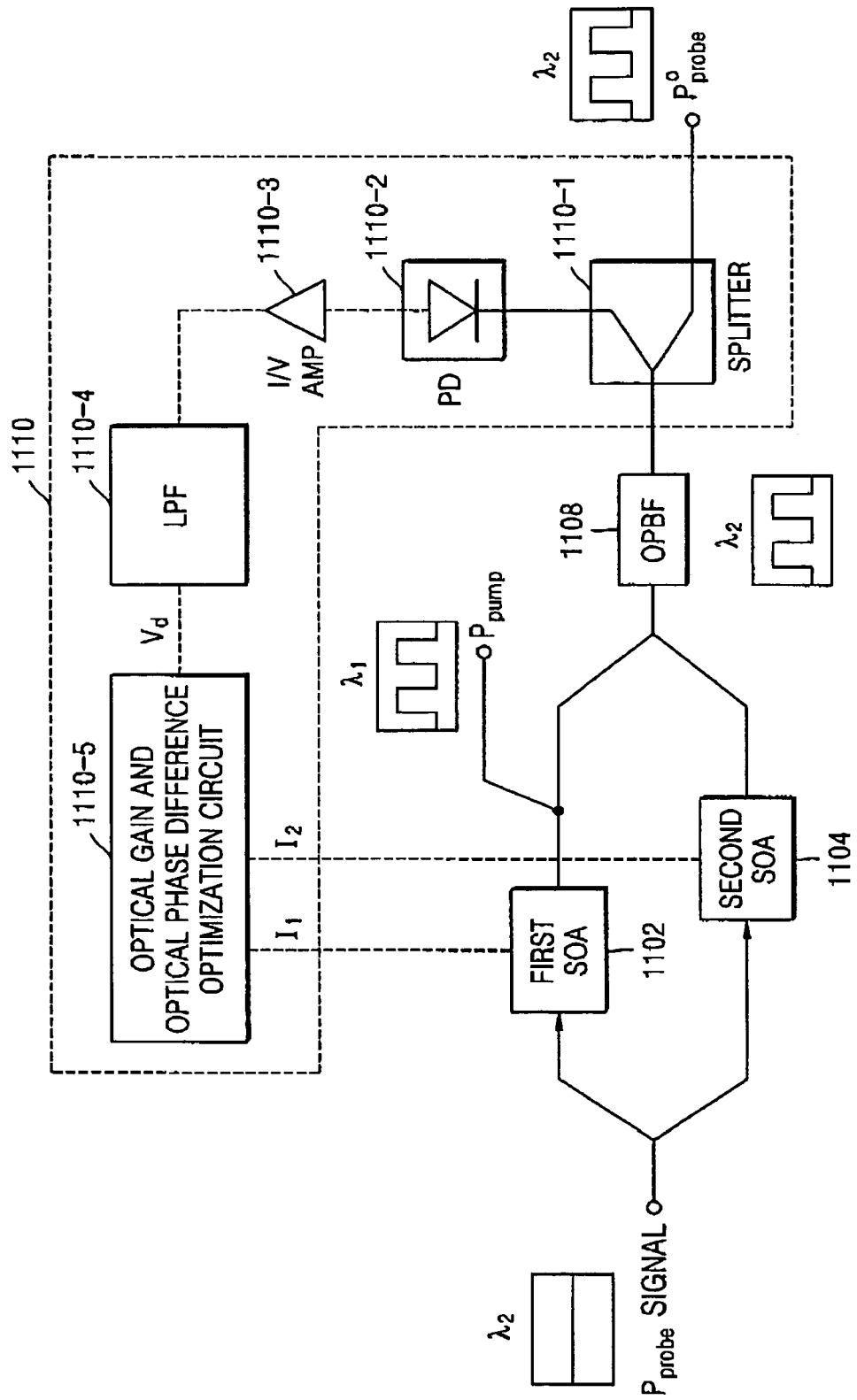
FIG. 11 illustrates a block diagram of a structure of an SOA-MZI wavelength converter according to yet another embodiment of the present invention.

Initially, principles of the method embodiments of the present invention will be described with reference generally to the SOA-MZI of FIG. 1. However, apparatus implementations according to embodiment of the present invention are shown in FIGS. 9 to 11.

A general definition of an extinction ratio (ER) may be given as Equation 1.

$$ER = 10\log\left(\frac{\text{high level}}{\text{low level}}\right) \qquad \text{[Equation 1]}$$

Accordingly, the ER of an SOA-MZI wavelength converter can be expressed as in Equation 2.

$$ER = 10\log\left(\frac{P_{OH}}{P_{OL}}\right) \qquad \text{[Equation 2]}$$

Here, $P_O$ is an optical power level of a probe output signal generated from the SOA-MZI wavelength converter, $P_{OH}$ is an optical power level of a probe output signal having a logic 1 (high state) and $P_{OL}$ is an optical power level of a probe output signal having a logic 0 (low state).

The optical power levels $P_{OH}$ and $P_{OL}$ can be expressed by Equations 3 and 4.

$$P_{OH} = P_1[G_{1H} + G_2 + 2\sqrt{G_{1H} \cdot G_2} \cos(\phi + \phi_{XPM})] \qquad \text{[Equation 3]}$$

$$P_{OL} = P_1[G_{1L} + G_2 + 2\sqrt{G_{1L} \cdot G_2} \cos\phi] \qquad \text{[Equation 4]}$$

Here, $P_1$ is an optical power level of a probe input signal input to the SOA-MZI wavelength converter. $G_{1H}$ and $G_{1L}$ are optical gains experienced by $(P_1+P_{2H})$ and $(P_1+P_{2L})$ transmitted by the first arm, respectively. $P_{2H}$ and $P_{2L}$ are the optical power levels of a pump input signal corresponding to logic 1 and logic 0, respectively. $G_2$ is an optical gain of the second arm. φ is an optical phase difference between the two arms of the SOZ-MZI wavelength converter. $\phi_{XPM}$ is a phase shift due to XPM in the first SOA 102.

$P_1G_{1L}$ and $P_1G_{1H}$ of the probe signal transmitted by the first SOA 102 interfere differently with $P_1G_2$ of the probe signal transmitted by the second SOA 104. This is because $\phi_{XPM}$ is generated in the first SOA 102 only when the probe input signal is logic 1. Thus, $P_1G_2$ of the probe signal transmitted by the second SOA 104 destructively interferes with $P_1G_{1L}$ and constructively interferes with $P_1G_{1H}$ of the probe signal transmitted by the first SOA 102.

Referring to Equations 3 and 4, since the $P_{OH}$ and $P_{OL}$ change according to the optical phase difference φ, each has maximum and minimum values. In Equations 3 and 4, if four levels of the $P_{OH}$ and $P_{OL}$ changing according to the optical phase difference φ are identified, $P_1G_{1L}$, $P_1G_{1H}$, $P_1G_2$, and $\phi_{XPM}$ can be obtained.

Referring to Equations 3 and 4, $P_{OH}$ has a maximum value when $\phi=-\phi_{XPM}$, while $P_{OL}$ has a maximum value when $\phi=0$. $P_{OH}$ has a minimum value when $\phi=-\phi_{XPM}+\pi$, while $P_{OL}$ has a minimum value when $\phi=\pi$.

The maximum and minimum values of each of $P_{OH}$ and $P_{OL}$ may be obtained by changing the optical phase difference $\phi$ in a state in which the phase shift $\phi_{XPM}$ is fixed in Equations 3 and 4. This may be achieved by changing the phase shift using the phase shifter 106. In changing the optical phase difference $\phi$, $\phi=0$ may be set as a reference point because the equations regarding the $P_{OH}$ and $P_{OL}$ are simplified at points where $\phi$ is zero or integer multiples of $\pi$.

Figure 5:
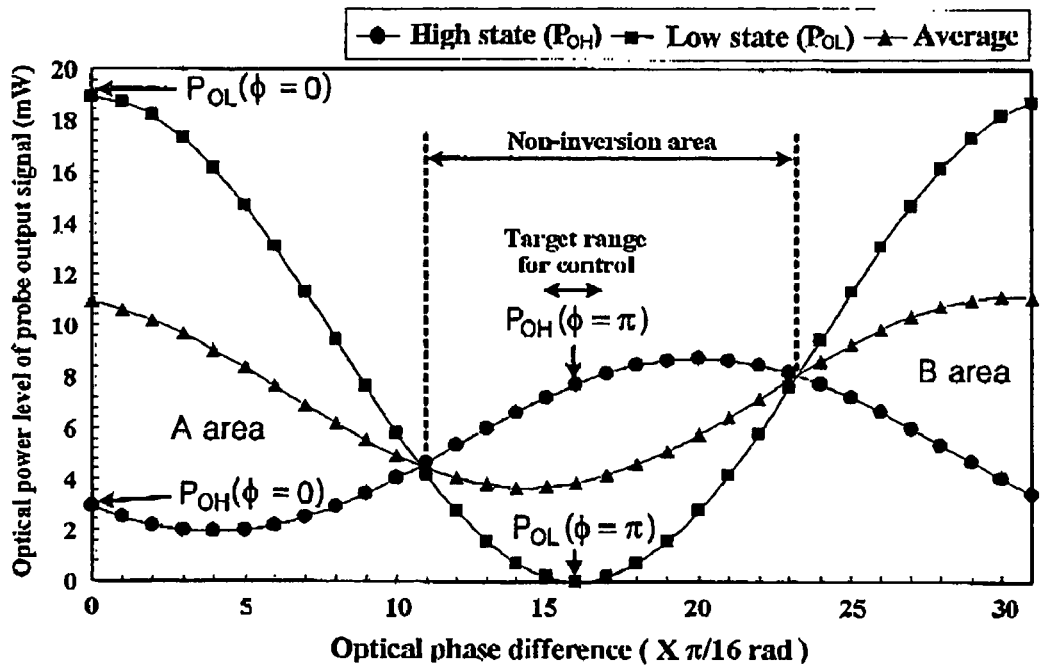
FIG. 5 illustrates a graph showing an example of transfer characteristic curves varying according to the optical phase difference φ between two arms of the SOA-MZI wavelength converter.

When $\phi=0$, $P_{OL}(\phi=0)$ is inverted from its proper transfer characteristic curve and $P_{OH}(\phi=0)$ is inverted from its proper transfer characteristic curve. Likewise, when $\phi=\pi$, $P_{OL}(\phi=\pi)$ has its proper transfer characteristic curve and $P_{OH}(\phi=\pi)$ has its proper transfer characteristic curve. As can be seen in FIG. 5, discussed in detail below, when $P_{OL}(\phi=0)$, $P_{OL}$ is at a maximum, and when $P_{OL}(\phi=\pi)$, $P_{OL}$ is at a minimum. The values of $P_{OL}$ and $P_{OH}$ may be determined at these points. Thus, when the four levels $P_{OL}(\phi=0)$, $P_{OH}(\phi=0)$, $P_{OH}(\phi=\pi)$, and $P_{OL}(\phi=\pi)$ existing on the transfer characteristic curve of the $P_{OL}$ and the transfer characteristic curve of the $P_{OH}$ are identified, $P_1G_{1L}$, $P_1G_{1H}$, $P_1G_2$, and $\phi_{XPM}$ can be easily obtained.

When the four levels $P_{OL}(\phi=0)$, $P_{OH}(\phi=0)$, $P_{OH}(\phi=\pi)$, and $P_{OL}(\phi=\pi)$ are substituted into Equations 3 and 4, the following Equations 5 through 8 are obtained. Equations 5 through 9 are obtained for each of $P_1G_{1L}$, $P_1G_{1H}$, $P_1G_2$ and $\phi_{XPM}$.

When $\sqrt{G_{1L}} \geq \sqrt{G_2}$, $P_1G_{1L}=(\sqrt{P_{OL}(\phi=0)}+\sqrt{P_{OL}(\phi=\pi)})^2/4$, $P_1G_2=(\sqrt{P_{OL}(\phi=0)}-\sqrt{P_{OL}(\phi=\pi)})^2/4$ [Equation 5]

When $\sqrt{G_{1L}} \leq \sqrt{G_2}$, $P_1G_{1L}=(\sqrt{P_{OL}(\phi=0)}-\sqrt{P_{OL}(\phi=\pi)})^2/4$, $P_1G_2=(\sqrt{P_{OL}(\phi=0)}+\sqrt{P_{OL}(\phi=\pi)})^2/4$ [Equation 6]

$P_1G_{1H}=-P_1G_2+(\sqrt{P_{OH}(\phi=0)}+\sqrt{P_{OH}(\phi=\pi)})/2$ [Equation 7]

$$\phi_{XPM} = \cos^{-1}\left[\frac{P_{OH}(\phi=0) - P_1G_{1H} - P_1G_2}{2P_1\sqrt{G_{1H} \cdot G_2}}\right]$$ [Equation 8]

As shown in Equations 5 through 8, the values of $P_1G_{1L}$, $P_1G_{1H}$, $P_1G_2$ and $\phi_{XPM}$ may be readily calculated from the four levels $P_{OL}(\phi=0)$, $P_{OH}(\phi=0)$, $P_{OH}(\phi=\pi)$ and $P_{OL}(\phi=\pi)$ obtained by changing the optical phase difference $\phi$ in the SOA-MZI wavelength converter. Transfer characteristic curves with respect to the $P_{OH}$ and $P_{OL}$ according to the optical phase difference $\phi$ can be obtained by substituting the values of $P_1G_{1L}$, $P_1G_{1H}$, $P_1G_2$ and $\phi_{XPM}$ in Equations 3 and 4.

Figure 4:
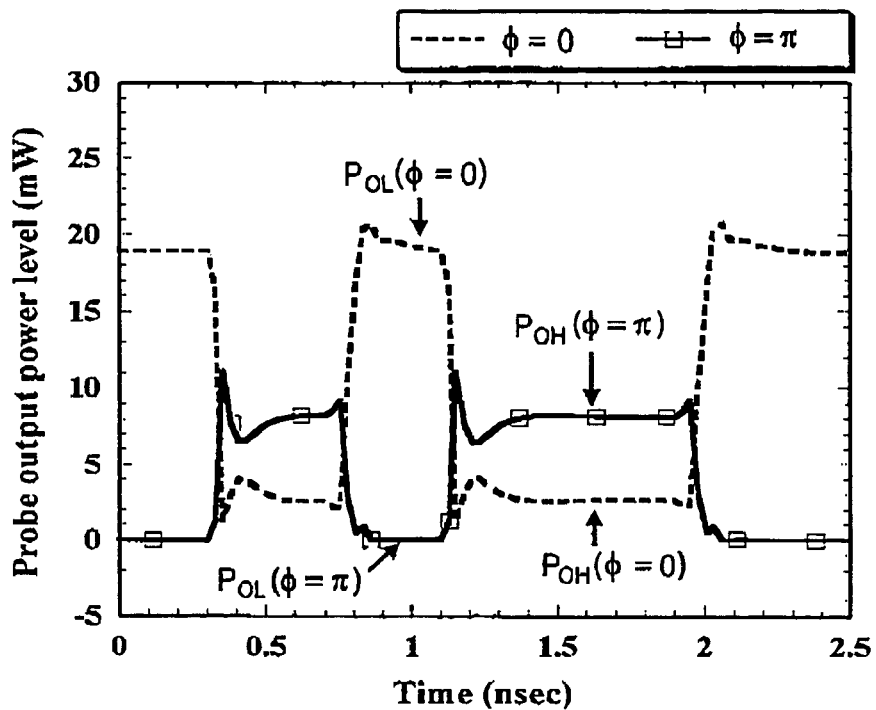
FIG. 4 illustrates a graph showing an example of a probe output signal varying according to the optical phase difference φ between two arms of the SOA-MZI wavelength converter.

FIG. 4 illustrates an example of the probe output signal varying in accordance with the optical phase difference $\phi$ between the two arms of the SOA-MZI wavelength converter. The example shown in FIG. 4 is from a simulation when a 2.5 Gbps pump signal is input. A $P_{OL}$ pulse signal and a $P_{OH}$ pulse signal in FIG. 4. FIG. 4 show the four levels $P_{OL}(\phi=0)$, $P_{OH}(\phi=0)$, $P_{OH}(\phi=\pi)$ and $P_{OL}(\phi=\pi)$.

The values of $P_1G_{1L}$, $P_1G_{1H}$, $P_1G_2$, and $\phi_{XPM}$ may be obtained by inserting the four levels $P_{OL}(\phi=0)$, $P_{OH}(\phi=0)$, $P_{OH}(\phi=\pi)$, and $P_{OL}(\phi=\pi)$ in Equations 5 through 8. The obtained values of $P_1G_{1L}$, $P_1G_{1H}$, $P_1G_2$, and $\phi_{XPM}$ may then be inserted into Equations 3 and 4 to obtain the transfer characteristic curves of $P_{OH}$ and $P_{OL}$ that vary according to the optical phase difference $\phi$.

FIG. 5 illustrates an example of the transfer characteristic curves varying according to the optical phase difference $\phi$ between the two arms of the SOA-MZI wavelength converter. Referring to FIG. 5, when $\phi=0$, $P_{OL}(\phi=0)$ is inverted from the proper the transfer characteristic curve of the $P_{OL}$ and $P_{OH}(\phi=0)$ is inverted from the proper transfer characteristic curve of $P_{OH}$. When ($\phi=\pi$, $P_{OL}(\phi=\pi)$ has the proper transfer characteristic curve of $P_{OL}$ and $P_{OH}(\phi=\pi)$ has the proper transfer characteristic curve of $P_{OH}$.

An area where the transfer characteristic curve of the $P_{OH}$ is higher than the transfer characteristic curve of the $P_{OL}$ is a non-inverted area and other areas are inverted areas. Since the transfer characteristic curves of the $P_{OH}$ and $P_{OL}$ are non-linear as shown in FIG. 4, there is a need to additionally perform a linear control by separating an inverted area A and an inverted area B from the non-inverted area. The transfer characteristic curves shown in FIG. 5 can be used to control the optical gains of the SOA and the phase shift of the phase shifter 106 to optimize the ER of the probe output signal in the SOA-MZI wavelength converter.

Figure 6:
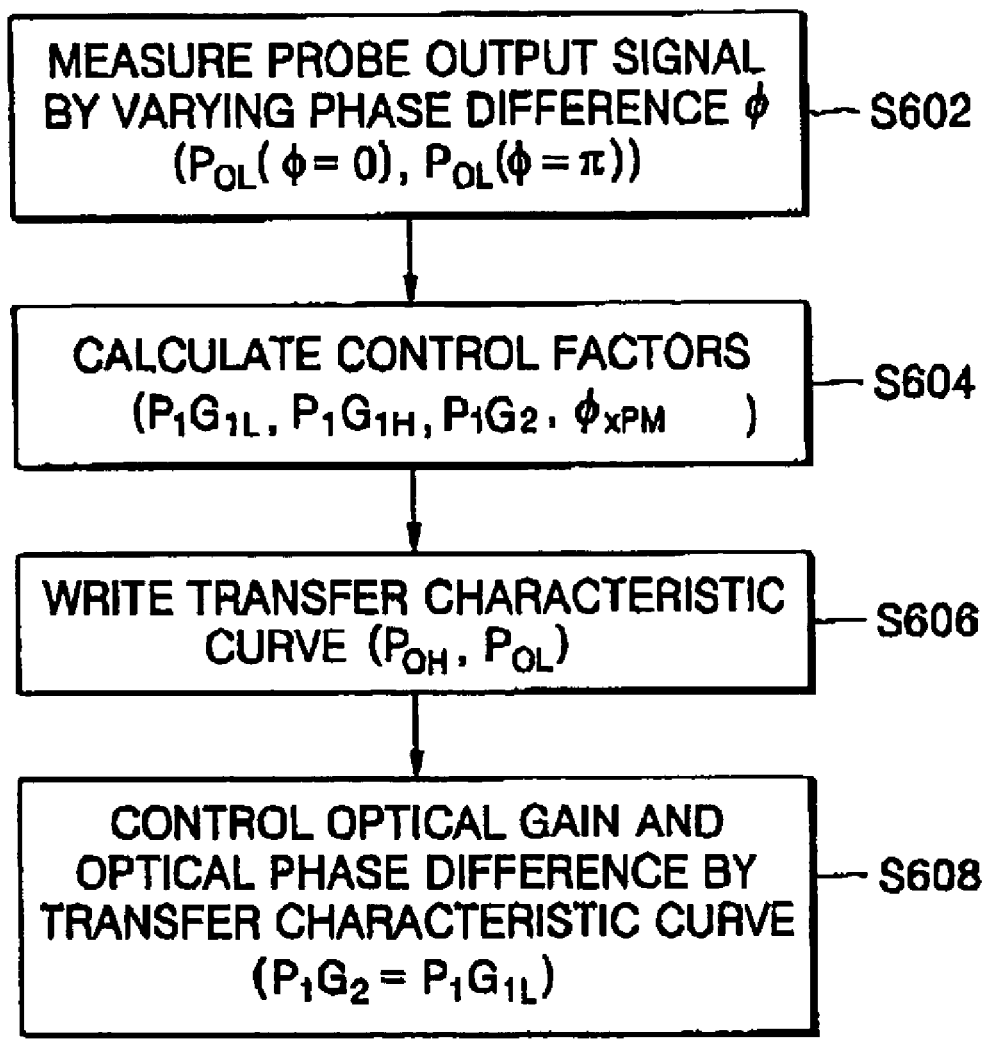
FIG. 6 illustrates a flowchart of a method of controlling an SOA-MZI wavelength converter according to an embodiment of the present invention.

FIG. 6 illustrates a flowchart of a method of controlling an SOA-MZI wavelength converter according to an embodiment of the present invention. Referring to FIG. 6, transfer characteristic curves of the probe output signals $P_{OH}$ and $P_{OL}$ corresponding to the pump input signals of logic 1 and logic 0 are obtained. For this purpose, pulse signals of the $P_{OH}$ and $P_{OL}$ as shown in FIG. 4 may be obtained by measuring the optical power level of the probe output signal while changing the optical phase difference $\phi$. The values of the $P_{OL}(\phi=0)$, $P_{OH}(\phi=0)$, $P_{OH}(\phi=\pi)$, and $P_{OL}(\phi=\pi)$ may be obtained from the pulse signals (S602). The optical phase difference $\phi$ may be changed in two ways, i.e., changing the phase shift introduced by the phase shifter 106 or by changing the optical gains of the two SOAs, i.e., by changing the bias current.

As shown in Equation 8, $\phi_{XPM}$ may be determined by the optical gains of the SOAs, which in turn are proportional to the applied bias current. Thus, $\phi_{XPM}$ may be changed by changing the bias current of the two SOAs.

The values of the $P_1G_{1L}$, $P_1G_{1H}$, $P_1G_2$, and $\phi_{XPM}$ may be obtained by inserted the measured values of the $P_{OL}(\phi=0)$, $P_{OH}(\phi=0)$, $P_{OH}(\phi=\pi)$ and $P_{OL}(\phi=\pi)$ obtained in the step S602 in Equations 5 through 8 (S604).

Then, the values of $P_1G_{1L}$, $P_1G_{1H}$, $P_1G_2$ and $\phi_{XPM}$ may be inserted in Equations 3 and 4 to obtain the $P_{OH}$ and $P_{OL}$ transfer characteristic curves by changing the optical phase difference $\phi$ as shown in FIG. 5 (S606).

When the amplitudes of the probe signals output from the first and second SOAs are equal when the input pump signal is logic 0, i.e., the optical phases of the probe signals output from the first and second arms are opposite, the ER of the SOA-MZI wavelength converter is maximized. Thus, to maximize the ER, the optical gains of the two arms are adjusted so the amplitudes of the probe signals output by the two arms are equal when their optical phase difference is $\pi$.

In an embodiment of the present invention, the ER of the SOA-MZI wavelength converter may be optimized by adjusting the optical gains of the two SOAs and/or the phase shift using the $P_{OH}$ and $P_{OL}$ transfer characteristic curves obtained through the steps S602 through S606 such that $P_1G_2=(P_1+P_{2H})G_{1L}$. Also, when the amplitude of the pump input signal changes, since the optical gains of the two SOAs can be automatically adjusted, the IPDR can be increased. Further, when the operational environment of the SOA-MZI wavelength converter changes, optimal optical gain and phase difference $\phi$ may be maintained.

Controlling an optical gain difference according to an embodiment of the present invention relies on the proportional relationship between the size of the optical gain of the SOA and the applied bias current. When the bias current $i_1$ of the first SOA 102 increases, $G_{1L}$ increases and $P_{OL}(\phi=0)$ increases. In contrast, $P_{OH}(\phi=0)$ decreases, since it is affected more by the increase in the phase shift $\phi_{XPM}$ than by the increase in the $G_{1H}$. The $P_{OH}(\phi=\pi)$ increases when $G_{1H}$ and $\phi_{XPM}$ increase. However, the $P_{OH}(\phi=\pi)$ decreases and then increases around $P_1G_2=(P_1+P_{2L})G_{1L}$ because perfect destructive interference occurs when $P_1G_2$ equals $(P_1+P_{2H})G_{1L}$.

When the bias current $i_2$ of the second SOA 104 increases, $G_2$ further increases, and $P_{OL}(\phi=0)$, $P_{OH}(\phi=0)$ and $P_{OH}(\phi=\pi)$ increase. In contrast, $P_{OL}(\phi=\pi)$ decreases and then increases around equalization of $P_1G_2$ and $(P_1+P_{2H})G_{1L}$ again due to perfect destructive interference.

When $P_{2H}$ increases, since the value of $\phi_{XPM}$ increases in proportion thereto, $P_{OH}(\phi=0)$ decreases while $P_{OH}(\phi=\pi)$ increases. However, $P_{OL}(\phi=0)$ and $P_{OL}(\phi=\pi)$ remain unchanged.

In the method of controlling an optical gain difference and/or an optical phase shift according to an embodiment of the present invention, the optical gain may be controlled by using the above correlations.

Figure 7:
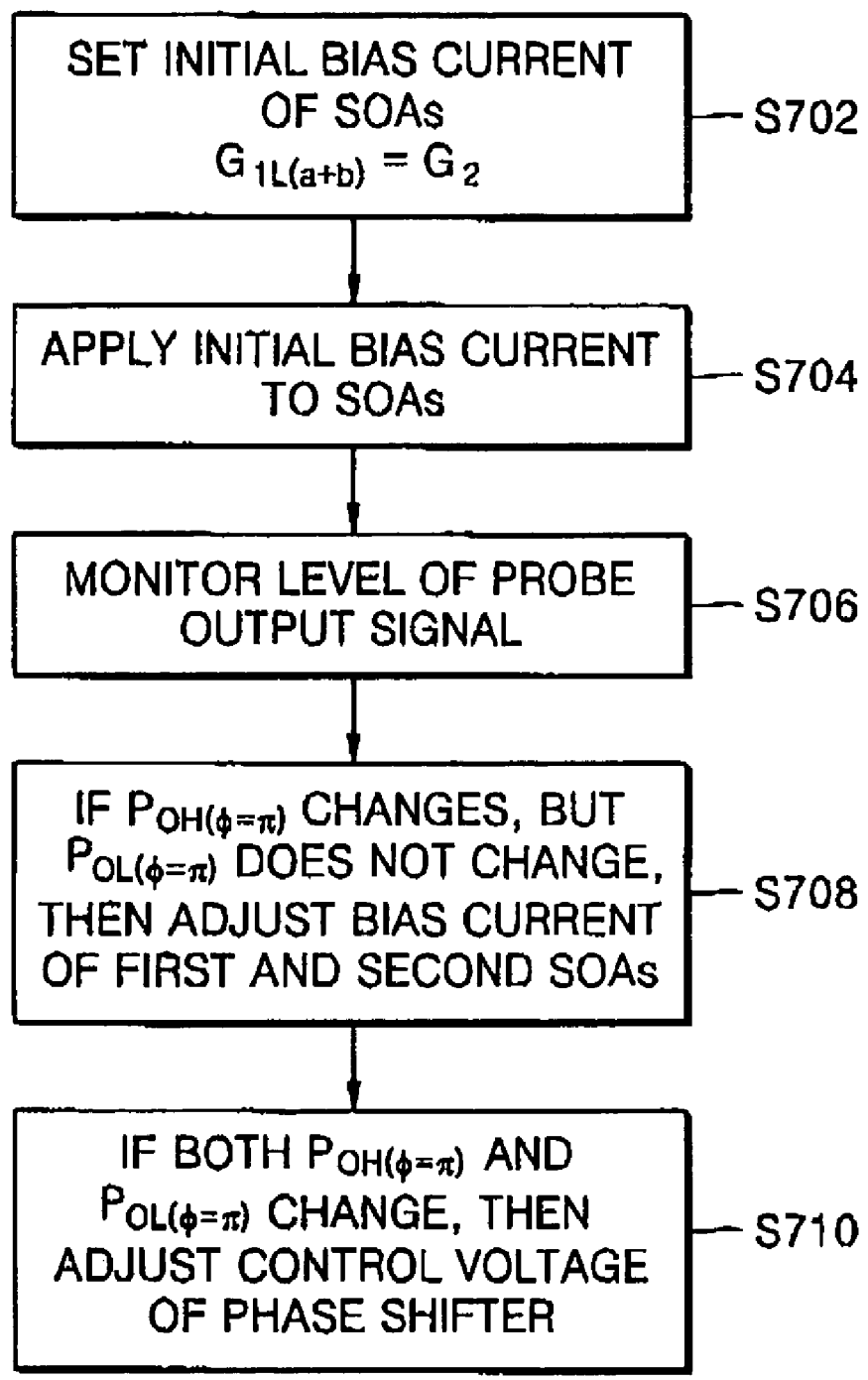
FIG. 7 illustrates a flowchart of a method of controlling an optical gain difference according to an embodiment of the present invention.

FIG. 7 illustrates a flowchart of a method of controlling an optical gain difference according to an embodiment of the present invention. Referring to FIG. 7, when the pump input signal is logic 0 and the optical power level of the probe output signal output from the first arm is the same as that of the probe output signal output from the second arm, the ER of the SOA-MZI wavelength converter is maximized. Thus, in order to maximize the ER, the amplitudes of the probe signals of logic 0 output by the two arms may be equalized by adjusting the optical gains of the two SOAs.

According to an embodiment of the present invention, the ER of the SOA-MZI wavelength converter may be optimized by adjusting the optical gains of the two SOAs using the $P_{OH}$ and $P_{OL}$ transfer characteristic curves.

First, bias currents of the first and second SOAs setting $G_{1L}$ and $G_2$ to provide equalized outputs from the two arms (S702) may be initialized. Bias current values for initialization may be determined using one of two algorithms.

In the first algorithm, combinations with respect to the bias current of the first and second SOAs are set in advance. The bias current combinations are set with an appropriate resolution within a range of the maximum of the bias current. The bias currents are applied to the first and second SOAs according to the set combinations. By changing the optical phase difference $\phi$, an average level and a standard deviation, or a peak hold level and a bottom hold level, corresponding to $P_{OL}(\phi=0)$, $P_{OH}(\phi=0)$, $P_{OH}(\phi=\pi)$ and $P_{OL}(\phi=\pi)$, are measured from the probe output signal which varies with the optical phase difference $\phi$. The measured values may be stored in a memory (not shown). This process is performed for all of the bias current combinations.

The $P_{OL}(\phi=0)$, $P_{OH}(\phi=0)$, $P_{OH}(\phi=\pi)$, and $P_{OL}(\phi=\pi)$ of each bias current combination are inserted in Equations 5 through 8 to obtain the values of the $P_1G_{1L}$, $P_1G_{1H}$, $P_1G_2$, and $\phi_{XPM}$. Whether the arms outputs are equalized from a given bias current combination may be determined using the obtained values of the $P_1G_{1L}$, $P_1G_{1H}$, $P_1G_2$ and $\phi_{XPM}$. This process is performed for all of the bias current combinations. Based on this determination, a bias current combination equalizing the arm outputs is set.

In the second algorithm, several reference combinations of bias currents are set in advance. Bias currents are applied to the first and second SOAs according to a set combination. By changing the optical phase difference $\phi$, an average level and a standard deviation, or a peak hold level and a bottom hold level, corresponding to $P_{OL}(\phi=0)$, $P_{OH}(\phi=0)$, $P_{OH}(\phi=\pi)$, and $P_{OL}(\phi=\pi)$ may be measured from the probe output signal which varies with the change in the optical phase difference $\phi$. The measured values may be stored in a memory (not shown). This process may be performed for several bias current combinations, but for fewer combinations than in the first algorithms.

$P_{OL}(\phi=0)$, $P_{OH}(\phi=0)$, $P_{OH}(\phi=\pi)$ and $P_{OL}(\phi=\pi)$ of each bias current combination are inserted in Equations 5 through 8 to obtain the values of the $P_1G_{1L}$, $P_1G_{1H}$, $P_1G_2$ and $\phi_{XPM}$. An optimal bias current combination may be determined using a correlation between the obtained values of the $P_1G_{1L}$, $P_1G_{1H}$, $P_1G_2$ and $\phi_{XPM}$ and the $P_{OL}(\phi=0)$, $P_{OH}(\phi=0)$, $P_{OH}(\phi=\pi)$ and $P_{OL}(\phi=\pi)$.

The bias currents set in step S702 are applied to the first and second SOAs (S704). Even when the optimal initial bias currents are applied to the first and second SOAs, when the logic 1 level $P_{2H}$ of the pump input signal changes, the phase shift $\phi_{XPM}$ changes. Accordingly, an optimal ER is not maintained.

When the logic 1 $P_{2H}$ of the pump input signal increases, since the value of the phase shift $\phi_{XPM}$ increases accordingly, $P_{OH}(\phi=0)$ decreases while the $P_{OH}(\phi=\pi)$ increase. However, $P_{OL}(\phi=0)$ and $P_{OL}(\phi=\pi)$ remain unchanged.

Since $P_{OH}(\phi=\pi)$ and $P_{OL}(\phi=\pi)$ are obtained when $(\phi=\pi)$ they can be monitored in real time. The optical power level of the probe output signal is monitored (S706). When the logic 1 $P_{2H}$ of the pump input signal changes, the phase shift $\phi_{XPM}$ generated from the first SOA changes. When the phase shift $\phi_{XPM}$ changes, the $P_{OH}(\phi=\pi)$ changes in direct proportion thereto, but the $P_{OL}(\phi=\pi)$ does not change.

Thus, when the $P_{OH}(\phi=\pi)$ changes, but the $P_{OL}(\phi=\pi)$ does not, it may be determined that the logic 1 $P_{2H}$ of the pump input signal increases. In this case, the bias current of the first and second SOAs may be adjusted so that the initial $P_{OH}(\phi=\pi)$ is output (S708). Since the bias current of the first and second SOAs are directly proportional to $P_{OH}(\phi=\pi)$, $P_{OH}(\phi=\pi)$ may be adjusted by changing the bias current of the first and second SOAs.

That is, since the change in the logic 1 $P_{2H}$ of the pump input signal is reflected to the optical power levels $P_{OH}(\phi=\pi)$ and $P_{OL}(\phi=\pi)$ of the probe output signal, the optical gains of the first and second SOAs may be automatically adjusted so that the optical phase shift $\phi_{XPM}$ can be maintained to be an appropriate value. Accordingly, the IPDR of the SOA-MZI wavelength converter may be improved.

When both optical power levels $P_{OH}(\phi=\pi)$ and $P_{OL}(\phi=\pi)$ of the probe output signal change, which means that the optical phase difference $\phi$ changes, a control voltage of the phase may be controlled in an optical phase difference control method described later (S710).

Figure 8:
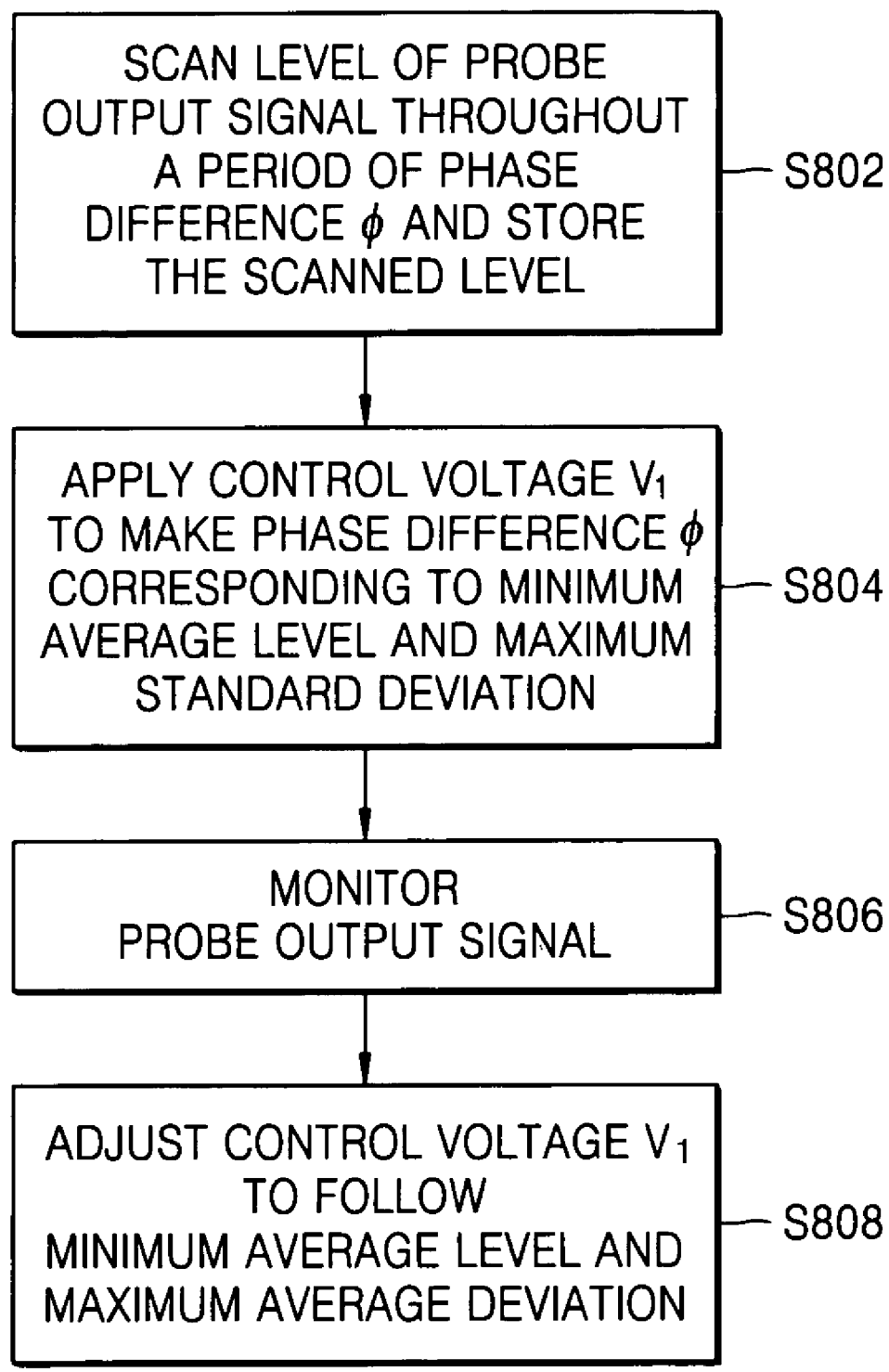
FIG. 8 illustrates a flowchart of a method of controlling an optical phase difference according to an embodiment of the present invention.

FIG. 8 illustrates a flow chart of a method of controlling an optical phase shift according to an embodiment of the present invention. Referring to FIG. 8, to maintain an optimal optical phase difference $\phi$, the method of controlling an optical phase difference according to an embodiment of the present invention maintains the minimum average level and the maximum standard deviation or the maximum of a difference between a peak hold level and a bottom hold level. It is assumed that the initial bias current of the first and second SOAs are set through step S702 of FIG. 7.

Referring to FIG. 5, an area where the transfer characteristic curve of the $P_{OH}$ is higher than the transfer characteristic curve of the $P_{OL}$ is a non-inverted area and where the transfer characteristic curve of the $P_{OL}$ is higher than the transfer characteristic curve of the $P_{OH}$ is an inverted area. Since the $P_{OH}$ and $P_{OL}$ transfer characteristic curves are non-linear, as shown in FIG. 4, there is a need to additionally perform a linear control by eliminating the inverted areas A and B. Thus, whether a current optical phase difference is in the non-inverted area or in either area A or area B needs to be determined.

For this determination, the average level and its standard deviation or a peak hold level and a bottom hold level of the probe output signal are scanned in advance throughout a range of a period of the optical phase difference $\phi$ (S802). As the optical phase difference $\phi$ increases, the average level of the probe output signal decreases in the area A and increases in the area B. The area A and area B are identified using this principle.

A control voltage $V_1$ corresponding to the minimum average level and the maximum standard deviation, or the maximum of a difference between a peak hold level and a bottom hold level, calculated in the area B may be initially applied to the phase shifter (S804). The average level and the standard deviation, or a peak hold level and a bottom hold level, of the probe output signal may be monitored (S806).

As the optical phase difference $\phi$ increases or decreases, the average level and standard deviation of the probe output signal change. The average level and standard deviation of the probe output signal are continuously monitored and, when the average level and standard deviation of the probe output signal change, an optimal ER is maintained by controlling the optical phase difference $\phi$.

When there is a change in the average level and its standard deviation, or a peak hold level and a bottom hold level, of the probe output signal, the control voltage $V_1$ applied to the phase shifter is changed to follow the minimum average level and the maximum standard deviation, or the maximum of a difference between a peak hold level and a bottom hold level, applied in the step S704 (S808).

The optical phase difference $\phi$ in the area A and area B is controlled in an opposite manner. For example, to obtain a lower average level, the optical phase difference $\phi$ in the area A and area B must be controlled to be increased or decreased, respectively.

Thus, according to the method of controlling an optical phase difference according to the present invention, even when an additional optical phase difference is generated due to a change in external environment, an optimal optical phase difference may be restored so that an optimal ER can be maintained.

FIG. 9 illustrates a block diagram of a structure of an SOA-MZI wavelength converter according to an embodiment of the present invention. Referring to FIG. 9, the SOA-MZI wavelength converter may include a first SOA 902, a second SOA 904, a phase shifter 906, an OBPF 908, and an optical gain and optical phase difference control portion 910. The optical gain and phase difference control portion 910 may include a splitter 910-1, a photodiode 910-2, an I/V amplifier 910-3, a peak and bottom hold circuit 910-4 and an optical gain and phase difference optimization circuit 910-5.

FIG. 10 illustrates a block diagram of a structure of an SOA-MZI wavelength converter according to another embodiment of the present invention. Referring to FIG. 10, the SOA-MZI wavelength converter may include a first SOA 1002, a second SOA 1004, a third SOA 1006, an OBPF 1008 and an optical gain and phase difference control portion 1010. The optical gain and phase difference control portion 1010 may include a splitter 1010-1, a photodiode 1010-2, an I/V amplifier 1010-3, a peak and bottom hold circuit 1010-4 and an optical gain and phase difference optimization circuit 1010-5.

In FIG. 10, the third SOA 1006 performs the same operation as that of the phase shifter 906 in FIG. 9. That is, the third SOA 1006 changes the phase of an input probe signal according to bias current $I_3$ applied thereto.

FIG. 11 illustrates a block diagram of a structure of an SOA-MZI wavelength converter according to yet another embodiment of the present invention. Referring to FIG. 11, the SOA-MZI wavelength converter may include a first SOA 1102, a second SOA 1104, an OBPF 1108, and an optical gain and phase difference control portion 1110. The optical gain and phase difference control portion 1110 may include a splitter 1110-1, a photodiode 1110-2, an I/V amplifier 1110-3, a low pass filter (LPF) 1110-4 and an optical gain and phase difference optimization portion 1110-5.

In FIG. 11, the SOA-MZI wavelength converter does not include the phase shifter 906 of FIG. 9 or the third SOA 1006 of FIG. 10. That is, the SOA-MZI wavelength converter of FIG. 11, unlike the converters of FIGS. 10 and 11, performs a phase shift operation of the phase shifter 906 of FIG. 9 or the third SOA 1006 of FIG. 10 by controlling the bias current applied to the first and second SOAs 1102 and 1104.

In a co-propagation type SOA-MZI wavelength converter in which the pump signal and the probe signal are input in the same direction as shown in FIG. 9, an optical BPF for filtering the pump signal by blocking the wavelength $\lambda1$ of the pump signal and passing the wavelength $\lambda2$ of the probe signal is needed. However, the optical BPF is not needed in a counter-propagation type SOA-MZI wavelength converter in which the pump signal and the probe signal are input in different directions with respect to the SOA as shown in FIGS. 10 and 11. Thus, OBPF 1008 and OBPF 1108 may be eliminated.

Since operation of the converters shown in FIGS. 9 through 11 is similar, the operation of the optical gain and optical phase difference control apparatus according to the present invention will be described in detail with an example of the operation of the converter shown in FIG. 9.

The optical gain difference control operation of the SOA-MZI wavelength converter according to the present invention shown in FIG. 9 is described below with reference to FIG. 7. First, the optical gain and phase difference optimization portion 910-5 applies a bias current satisfying the condition that $G_{1L}=G_2$ to the first and second SOAs 902 and 904, respectively, as determined in accordance with step S702 of FIG. 7. After applying the initial bias current, the optical gain and phase difference optimization circuit 910-5 monitors the probe output signal.

The probe output signal is provided to the optical gain and phase difference optimization portion 910-5 through the splitter 910-1, the photodiode 910-2, the I/V amplifier 910-3 and the peak and bottom hold circuit 910-4.

Although the optimal initial bias currents are applied to the first and second SOAs 902 and 904, to maintain the condition that $G_{1L}=G_2$, the logic 1 level $P_{2H}$ needs to be monitored. When the phase shift $\phi_{XPM}$ changes, $P_{OH}(\phi=\pi)$ changes in direct proportion thereto, but $P_{OL}(\phi=\pi)$ does not change. Thus, when $P_{OH}(\phi=\pi)$ changes while $P_{OL}(\phi=\pi)$ does not, it is determined that the logic 1 level of the pump input signal has changed.

$P_{OH}(\phi=\pi)$ and $P_{OL}(\phi=\pi)$ are monitored in real time by the optical gain and phase difference optimization circuit 910-5. Thus, the optical gain and phase difference optimization circuit 910-5 can determine a case in which $P_{OH}(\phi=\pi)$ changes, but $P_{OL}(\phi=\pi)$ does not. In this case, the optical gain and phase difference optimization circuit 910-5 adjusts the bias current(s) of the first and second SOAs 902 and 904 so that the initial $P_{OH}(\phi=\pi)$ is output. Since the bias currents of the first and second SOAs 902 and 904 are directly proportional to $P_{OH}(\phi=\pi)$, $P_{OH}(\phi=\pi)$ can be adjusted by changing the bias current(s) of the first and second SOAs 902 and 904.

That is, since the change in the logic 1 level $P_{2H}$ of the pump input signal is reflected in one of the optical power levels $P_{OH}(\phi=\pi)$ and $P_{OL}(\phi=\pi)$ of the probe output signal, an optimal ER can be automatically maintained.

The optical phase difference control operation of the SOA-MZI wavelength converter according to the present invention shown in FIG. 9 is described with reference to FIG. 8.

The optical gain and phase difference optimization circuit 910-5 scans in advance the peak hold level and bottom hold level of the probe output signal over a period of the optical phase difference. For this purpose, the optical gain and phase difference optimization portion 910-5 controls the phase shifter 906 using the control voltage $V_1$.

Referring to FIG. 5, the control voltage $V_1$ corresponding to the minimum average level and the maximum standard deviation, or the maximum of a difference between a peak hold level and a bottom hold level, calculated in the area B (or A) may be applied as an initial value of the phase shifter 906. The peak hold level and bottom hold level, or the average level and the standard deviation, of the probe output signal are monitored.

As the optical phase difference increases or decreases, the average level and standard deviation of the probe output signal change. The average level and standard deviation of the probe output signal are continuously monitored and, when the average level and standard deviation of the probe output signal change, an optimal ER is maintained by controlling the optical phase difference.

When there is a change in the average level and its standard deviation, or a peak hold level and a bottom hold level, of the probe output signal, the control voltage $V_1$ applied to the phase shifter 906 is changed to follow the minimum average level and the maximum standard deviation, or the maximum of a difference between a peak hold level and a bottom hold level, applied when the initial control voltage is determined.

The optical phase difference in the area A and area B are controlled in opposite manners. For example, to obtain a lower average level, the optical phase difference in the area A and area B must be controlled to be increased or decreased, respectively.

As described above, by controlling at least one of an optical gain difference and an optical phase difference according to embodiments of the present invention, the IPDR may be increased and/or an optimal ER may be maintained automatically with respect to an amplitude of a probe output signal and relationships between the gains of the SOAs and $\phi_{XPM}$.

Exemplary embodiments of the present invention have been disclosed herein, and although specific terms are employed, they are used and are to be interpreted in a generic and descriptive sense only and not for purpose of limitation. For example, while embodiments of the present invention have been described relative to hardware implementations, the processing of the present invention may be implemented in software, e.g., by an article of manufacture having a machine-accessible medium including data that, when accessed by a machine, cause the machine to output signals to control the optical phase difference and/or the optical gain difference between the two arms. Accordingly, it will be understood by those of ordinary skill in the art that various changes in form and details may be made without departing from the spirit and scope of the present invention as set forth in the following claims.

What is claimed is:

1. A method of operating a semiconductor optical amplifier—Mach-Zehnder interferometer (SOA-MZI) wavelength converter having two arms, a first arm receiving a pump input signal and a probe input signal and a second arm receiving the probe input signal, the SOA-MZI outputting probe output signals $P_{OH}$ and $P_{OL}$, which correspond to pump input signals of logic high and logic low, respectively, the method comprising:

detecting an optical power level of the probe output signals $P_{OH}$ and $P_{OL}$; and controlling at least one of an optical gain difference between the two arms and an optical phase difference $\phi$ between the two arms in accordance with the detected optical power level of the probe output signals $P_{OH}$ and $P_{OL}$.

2. The method as claimed in claim 1, further comprising:

obtaining transfer characteristic curves of the probe output signals $P_{OH}$ and $P_{OL}$ by measuring an optical power level of the probe output signals $P_{OH}$ and $P_{OL}$ while changing the optical phase difference $\phi$ between the first and second arms and, wherein the controlling at least one of an optical gain difference between the two arms and an optical phase difference $\phi$ is further in accordance with the transfer characteristic curves.

3. The method as claimed in claim 2, wherein obtaining the transfer characteristic curves comprises:

setting a first value equal to a maximum value of the probe output signal $P_{OL}$, the maximum value of the probe output signal $P_{OL}$ occuring at a first time;

setting a second value equal to a value of the probe output signal $P_{OH}$ at the first time;

setting a third value equal to a minimum value of the probe output signal $P_{OL}$, the minimum value of the probe output signal $P_{OL}$ occuring at a second time;

setting a fourth value equal to a value of the probe output signal $P_{OH}$ at the second time;

determining control factors $P_1 G_{1L}$, $P_1 G_{1H}$, $P_1 G_2$, and $\phi_{XPM}$, in accordance with the first, second, third and fourth values, wherein $P_1$ is an optical power level of the probe input signal, $G_{1H}$ and $G_{1L}$ are optical gains the logic high and logic low respectively experienced by $P_{2H}$ and $P_{2L}$, which are optical power levels of the pump input signal corresponding to the logic high and logic low, respectively, in the first arm, $G_2$ is an optical gain of the second arm, and $\phi_{XPM}$ is an optical phase shift due to cross phase modulation (XPM); and determining the transfer characteristic curves using the control factors.

4. The method as claimed in claim 3, wherein, when the first value is $P_{OL}(\phi=0)$, the second value is $P_{OH}(\phi=0)$, the third value is $P_{OL}(\phi=\pi)$ and the fourth value is $P_{OH}(\phi=\pi)$, the control factors $P_1 G_{1L}$, $P_1 G_{1H}$, $P_1 G_2$, and $\phi_{XPM}$ are determined by the following equations, when $\sqrt{G_{1L}} \geq \sqrt{G_2}$, $P_1G_{1L}=(\sqrt{P_{OL}(\phi=0)}+\sqrt{P_{OL}(\phi=\pi)})^2/4$, and $P_1G_2=(\sqrt{P_{OL}(\phi=0)}-\sqrt{P_{OL}(\phi=\pi)})^2/4$, when $\sqrt{G_{1L}} \leq \sqrt{G_2}$, $P_1G_{1L}=(\sqrt{P_{OL}(\phi=0)}-\sqrt{P_{OL}(\phi=\pi)})^2/4$, and $P_1G_2=(\sqrt{P_{OL}(\phi=0)}+\sqrt{P_{OL}(\phi=\pi)})^2/4$, $P_1G_1=-P_1G_2+(\sqrt{P_{OH}(\phi=0)}+\sqrt{P_{OH}(\phi=\pi)})/2$, and $$\phi_{XPM} = \cos^{-1}\left[\frac{P_{OH}(\phi=0) - P_1G_{1H} - P_1G_2}{2P_1\sqrt{G_{1H} \cdot G_2}}\right].$$

5. The method as claimed in claim 4, wherein the $P_{OH}$ and $P_{OL}$ are determined by the following equations, $P_{OH}=P_1[G_{1H}+G_2+2\sqrt{G_{1H}\cdot G_2}\cos(\phi+\phi_{XPM})]$ and $P_{OL}=P_1[G_{1L}+G_2+2\sqrt{G_{1L}\cdot G_2}\cos\phi]$.

6. The method as claimed in claim 1, wherein, the controlling at least one of an optical gain difference between the two arms and an optical phase difference $\phi$ includes setting a probe output signal output from the first arm and a probe output signal output from the second arm to have equal amplitudes and opposite phases when the pump input signal is logic low.

7. The method as claimed in claim 6, wherein controlling the optical phase difference includes controlling a phase shifter in one of the first and second arms.

8. The method as claimed in claim 6, wherein controlling the optical phase difference includes controlling the optical gains of the first and second arms.

9. The method as claimed in claim 1, further comprising initializing the SOA-MZI by setting, for the pump input signal having logic low, the optical gain difference to zero.

10. The method as claimed in claim 9, wherein, when $P_{OH}$ changes but $P_{OL}$ does not, controlling comprises altering the optical gain difference.

11. The method as claimed in claim 9, wherein, when both $P_{OH}$ and $P_{OL}$ change, controlling comprises altering the optical phase difference.

12. The method as claimed in claim 9, further comprising:
determining a combination of bias currents of the first and second arms to set the optical gain difference to zero, including
setting combinations of the bias currents with respect to the first and second arms;
applying bias currents to the first and second arms according to the set combinations and measuring an average level and a standard deviation, or a peak hold level and a bottom hold level, corresponding to $P_{OL}(\phi=0)$, $P_{OH}(\phi=0)$, $P_{OH}(\phi=\pi)$, and $P_{OL}(\phi=\pi)$ from the probe output signal that changes according to a change in the optical phase difference $\phi$;
obtaining values of $P_1G_{1L}$, $P_1G_{1H}$, $P_1G_2$, and $\phi_{XPM}$ by the following equations using the measured $P_{OL}(\phi=0)$, $P_{OH}(\phi=0)$, $P_{OH}(\phi=\pi)$, and $P_{OL}(\phi=\pi)$ when $\sqrt{G_{1L}} \geq \sqrt{G_2}$, $P_1G_{1L}=(\sqrt{P_{OL}(\phi=0)}+\sqrt{P_{OL}(\phi=\pi)})^2/4$, and $P_1G_2=(\sqrt{P_{OL}(\phi=0)}-\sqrt{P_{OL}(\phi=\pi)})^2/4$, when $\sqrt{G_{1L}} \leq \sqrt{G_2}$, $P_1G_{1L}=(\sqrt{P_{OL}(\phi=0)}+\sqrt{P_{OL}(\phi=\pi)})^2/4$, and $P_1G_2=(\sqrt{P_{OL}(\phi=0)}+\sqrt{P_{OL}(\phi=\pi)})^2/4$, $P_1G_{1H}=-P_1G_2+(\sqrt{P_{OH}(\phi=0)}+\sqrt{P_{OH}(\phi=\pi)})/2$, and $$\phi_{XPM} = \cos^{-1}\left[\frac{P_{OH}(\phi=0) - P_1G_{1H} - P_1G_2}{2P_1\sqrt{G_{1H} \cdot G_2}}\right];$$

and
obtaining $P_{OH}$ and $P_{OL}$ transfer characteristic curves using the obtained values of $P_1G_{1L}$, $P_1G_{1H}$, $P_1G_2$ and $\phi_{XPM}$.

13. The method as claimed in claim 12, further comprising checking whether the optical gain difference is reduced to zero by a given bias current combination using the obtained values of $P_1G_{1L}$, $P_1G_{1H}$, $P_1G_2$, and $\phi_{XPM}$.

14. The method as claimed in claim 12, further comprising determining the combinations of the bias current satisfying the condition $G_{1L}=G_2$ from the transfer characteristic curves of the $P_{OH}$ and $P_{OL}$.

15. The method as claimed in claim 1, further comprising:
scanning the probe output signals $P_{OL}$ and $P_{OH}$ throughout a period of the optical phase difference; and
performing initialization to initially set an optical phase difference corresponding to a minimum value of the probe output signal $P_{OL}$,
wherein the controlling at least one of the optical phase difference and the optical gain difference comprises changing an optical phase difference between first and second arms to maintain amplitudes of $P_{OL}$ and $P_{OH}$ at initialization levels when there is a change in the detected optical power level of the probe output signal.

16. The method as claimed in claim 15, wherein the detected optical power level of the probe output signal is an average level and a standard deviation thereof.

17. The method as claimed in claim 15, wherein the detected optical power level of the probe output signal is a peak hold level and a bottom hold level.

18. An apparatus for controlling a semiconductor optical amplifier—Mach-Zehnder interferometer (SOA-MZI) wavelength converter having two arms, including
a first arm including a first semiconductor optical amplifier (SOA) receiving a pump input signal of a binary logic and a probe input signal, and
a second arm including a second semiconductor optical amplifier (SOA) connected in parallel to the first SOA and receiving the probe input signal, the SOA-MZI outputting probe output signals $P_{OH}$ and $P_{OL}$, which corresponds to pump input signals of logic high and logic low, respectively, the apparatus comprising:
an optical gain and optical phase difference control portion receiving a probe output signal, the optical gain and optical phase difference control portion altering at least one of an optical gain difference between the two arms and optical phase difference between the two arms in response to the probe output signal.

19. The apparatus as claimed in claim 18, wherein the optical gain and optical phase difference control portion comprises:
a photodetector receiving the probe output signals and outputting electrical probe signals;

a peak and bottom hold portion detecting a peak hold level and a bottom hold level of the electrical probe signals; and an optical gain and optical phase difference optimization portion controlling at least one of the optical gain difference and the optical phase difference between the two arms in accordance with a peak hold level and a bottom hold level of the electrical probe signal.

20. The apparatus as claimed in claim 19, wherein the optical gain and optical phase difference optimization portion:

obtains transfer characteristic curves of the probe output signals $P_{OH}$ and $P_{OL}$ by measuring an optical power level of the probe output signals $P_{OH}$ and $P_{OL}$ while changing an optical phase difference between the two arms; and further controls at least one of the optical gain difference and an optical phase difference between the two arms in accordance with the transfer characteristic curves.

21. The apparatus as claimed in claim 20, wherein the optical gain and optical phase difference optimization portion sets a first value equal to a maximum value of the probe output signal $P_{OL}$, the maximum value of the probe output signal $P_{OL}$ occuring at a first time;

sets a second value equal to a value of the probe output signal $P_{OH}$ at the first time;

sets a third value equal to a minimum value of the probe output signal $P_{OL}$, the minimum value of the probe output signal $P_{OL}$ occuring at a second time;

sets a fourth value equal to a value of the probe output signal $P_{OH}$ at the second time;

determines control factors $P_1G_{1L}$, $P_1G_{1H}$, $P_1G_2$, and $\phi_{XPM}$, in accordance with the first, second, third and fourth values, wherein $P_1$ is an optical power level of the probe input signal, $G_{1H}$ and $G_{1L}$ are optical gains the logic high and logic low respectively experienced by $P_{2H}$ and $P_{2L}$, which are optical power levels of the pump input signal corresponding to the logic high and logic low, respectively, in the first arm, $G_2$ is an optical gain of the second arm, and $\phi_{XPM}$ is an optical phase shift due to cross phase modulation (XPM) in the first arm; and determines the transfer characteristic curves using the control factors.

22. The apparatus as claimed in claim 21, wherein, when the first value is $P_{OL}(\phi=0)$, the second value is $P_{OH}(\phi=0)$, the third value is $P_{OL}(\phi=\pi)$ and the fourth value is $P_{OH}(\phi=\pi)$, the optical gain and optical phase difference optimization portion determines the control factors $P_1G_{1L}$, $P_1G_{1H}$, $P_1G_2$, and $\phi_{XPM}$ in accordance with the following equations, when $\sqrt{G_{1L}} \geq \sqrt{G_2}$, $P_1G_{1L}=(\sqrt{P_{OL}(\phi=0)}+\sqrt{P_{OL}(\phi=\pi)})^2/4$, and $P_1G_2=(\sqrt{P_{OL}(\phi=0)}-\sqrt{P_{OL}(\phi=\pi)})^2/4$, when $\sqrt{G_{1L}} \leq \sqrt{G_2}$, $P_1G_{1L}=(\sqrt{P_{OL}(\phi=0)}+\sqrt{P_{OL}(\phi=\pi)})^2/4$, and $P_1G_2=(\sqrt{P_{OL}(\phi=0)}-\sqrt{P_{OL}(\phi=\pi)})^2/4$, $P_1G_{1H}=-P_1G_2+(\sqrt{P_{OH}(\phi=0)}+\sqrt{P_{OH}(\phi=0)})/2$, and $$\phi_{XPM} = \cos^{-1}\left[\frac{P_{OH}(\phi=0) - P_1G_{1H} - P_1G_2}{2P_1\sqrt{G_{1H} \cdot G_2}}\right].$$

23. The apparatus as claimed in claim 22, wherein the optical gain and optical phase difference optimization portion determines the $P_{OH}$ and $P_{OL}$ in accordance with the following equations, $P_{OH}=P_1[G_{1H}+G_2+2\sqrt{G_{1H} \cdot G_2}\cos(\phi+\phi_{XPM})]$ and $P_{OL}=P_1[G_{1H}+G_2+2\sqrt{G_{1H} \cdot G_2}\cos\phi]$.

24. The apparatus as claimed in claim 19, wherein the optical gain and optical phase difference optimization portion controls at least one of the optical gain difference and the optical phase difference by setting a probe output signal output from the first arm and a probe output signal output from the second arm to have equal amplitudes and opposite phases when the pump input signal is logic low.

25. The apparatus as claimed in claim 19, wherein the SOA-MZI further includes a phase shifter in one of the first and second arms, the phase shifter controlling the optical phase difference between the first and second arms, wherein the optical gain and optical phase difference optimization portion controls the phase shifter.

26. The apparatus as claimed in claim 19, wherein the optical gain and optical phase difference optimization portion controls the optical phase difference $\phi$ between the two arms by controlling optical gains of the first and second SOAs.

27. The apparatus as claimed in claim 18, wherein the optical gain and optical phase difference control portion initializes the SOA-MZI by setting, for the pump input signal having logic low, the optical gain difference to zero.

28. The apparatus as claimed in claim 27, wherein, when $P_{OH}$ changes but $P_{OL}$ does not, the optical gain and optical phase difference control portion alters the optical gain difference.

29. The apparatus as claimed in claim 27, wherein, when both $P_{OH}$ and $P_{OL}$ change, the optical gain and optical phase difference control portion alters the optical phase difference.

30. The apparatus as claimed in claim 18, wherein the optical gain and optical phase difference control portion:

sets combinations of bias current with respect to the first and second SOAs;

applies the bias current to the first and second SOAs according to the set combinations and measures an average level and a standard deviation, or a peak hold level and a bottom hold level, corresponding to $P_{OL}(\phi=0)$, $P_{OH}(\phi=0)$, $P_{OH}(\phi=\pi)$, and $P_{OL}(\phi=\pi)$ from the probe output signal that changes according to a change in the optical phase difference $\phi$;

obtains values of $P_1G_{1L}$, $P_1G_{1H}$, $P_1G_2$, and $\phi_{XPM}$ by the following equations using the measured $P_{OL}(\phi=0)$, $P_{OH}(\phi=0)$, $P_{OH}(\phi=\pi)$, and $P_{OL}(\phi=\pi)$, when $\sqrt{G_{1L}} \geq \sqrt{G_2}$, $P_1G_{1L}=(\sqrt{P_{OL}(\phi=0)}+\sqrt{P_{OL}(\phi=\pi)})^2/4$, $P_1G_2=(\sqrt{P_{OL}(\phi=0)}+\sqrt{P_{OL}(\phi=\pi)})^2/4$, when $\sqrt{G_{1L}} \leq \sqrt{G_2}$, $P_1 G_{1H} = P_1 G_2 + (\sqrt{P_{OH}(\phi=0)} + \sqrt{P_{OH}(\phi=\pi)})/2$, and $$\phi_{XPM} = \cos^{-1}\left[\frac{P_{OH}(\phi=0) - P_1 G_{1H} - P_1 G_2}{2 P_1 \sqrt{G_{1H} \cdot G_2}}\right];$$

and obtains transfer characteristic curves of probe output signals $P_{OH}$ and $P_{OL}$ using the obtained values of $P_1 G_{1L}$, $P_1 G_{1H}$, $P_1 G_2$, and $\phi_{XPM}$.

31. The apparatus as claimed in claim 30, wherein the optical gain and optical phase difference control portion sets bias currents satisfying the condition $G_{1L}=G_2$ from the $P_{OH}$ and $P_{OL}$ transfer characteristic curves.

32. The apparatus as claimed in claim 30, wherein the optical gain and optical phase difference control portion obtains bias currents of the first and second SOAs satisfying the condition $G_{1L}=G_2$ by determining the combinations of the bias current satisfying the condition $G_{1L}=G_2$ from the transfer characteristic curves of the $P_{OH}$ and $P_{OL}$.

33. The apparatus as claimed in claim 18, wherein the optical gain and optical phase difference control portion:
scans the probe output signals $P_{OL}$ and $P_{OH}$ throughout a period of an optical phase difference;
performs initialization to initially set an optical phase difference corresponding to a minimum value of the probe output signal $P_{OL}$;
measures an optical power level of the probe output signals; and
changes an optical phase difference between the first and second arms to maintain amplitudes of $P_{OL}$ and $P_{OH}$ at initialization levels when there is a change in the detected optical power level of the probe output signal.

34. The apparatus as claimed in claim 33, wherein a measured optical power level of the probe output signal is an average level and a standard deviation thereof.

35. The apparatus as claimed in claim 33, wherein a measured optical power level of the probe output signal is a peak hold level and a bottom hold level.

36. An article of manufacture having a machine-accessible medium including data that, when accessed by a machine, cause the machine to operate a semiconductor optical amplifier—Mach-Zehnder interferometer (SOA-MZI) wavelength converter having two arms, a first arm receiving a pump input signal and a probe input signal and a second arm receiving the probe input signal, the SOA-MZI outputting probe output signals $P_{OH}$ and $P_{OL}$, which correspond to pump input signals of logic high and logic low, respectively, the operation comprising:
detecting an optical power level of the probe output signals $P_{OH}$ and $P_{OL}$; and
controlling at least one of an optical gain difference between the two arms and an optical phase difference $\phi$ between the two arms in accordance with the detected optical power level of the probe output signals $P_{OH}$ and $P_{OL}$.

37. The article as claimed in claim 36, wherein the operation further comprises:
obtaining transfer characteristic curves of the probe output signals $P_{OH}$ and $P_{OL}$ by measuring an optical power level of the probe output signals $P_{OH}$ and $P_{OL}$ while changing the optical phase difference $\phi$ between the first and second arms and,
wherein the controlling at least one of an optical gain difference between the two arms and an optical phase difference $\phi$ is further in accordance with the transfer characteristic curves.

38. The article as claimed in claim 36, wherein controlling at least one of an optical gain difference between the two arms and an optical phase difference $\phi$ includes setting a probe output signal output from the first arm and a probe output signal output from the second arm to have equal amplitudes and opposite phases when the pump input signal is logic low.

39. The article as claimed in claim 36, wherein the operation further comprises initializing the SOA-MZI by setting, for the pump input signal having logic low, the optical gain difference to zero.

40. The article as claimed in claim 36, wherein the operation further comprises:
scanning the probe output signals $P_{OL}$ and $P_{OH}$ throughout a period of the optical phase difference; and
performing initialization to initially set an optical phase difference corresponding to a minimum value of the probe output signal $P_{OL}$,
wherein the controlling at least one of the optical phase difference and the optical gain difference comprises changing an optical phase difference between first and second arms to maintain amplitudes of $P_{OL}$ and $P_{OH}$ at initialization levels when there is a change in the detected optical power level of the probe output signal.

* * * * *